(12) United States Patent
Yokino et al.

(10) Patent No.: US 7,369,720 B2
(45) Date of Patent: May 6, 2008

(54) OPTICAL DEVICE

(75) Inventors: Takafumi Yokino, Hamamatsu (JP);
Katsumi Shibayama, Hamamatsu (JP)

(73) Assignee: Hamamatsu Photonics K.K., Shizuoka (JP)

( * ) Notice: Subject to any disclaimer, the term of this patent is extended or adjusted under 35 U.S.C. 154(b) by 3 days.

(21) Appl. No.: 11/455,934

(22) Filed: Jun. 20, 2006

(65) Prior Publication Data

US 2007/0009199 A1    Jan. 11, 2007

(30) Foreign Application Priority Data

Jun. 22, 2005  (JP) .......................... P2005-182497

(51) Int. Cl.
*G02B 6/12* (2006.01)
(52) U.S. Cl. ...................................... 385/14
(58) Field of Classification Search .................. None
See application file for complete search history.

(56) References Cited

U.S. PATENT DOCUMENTS

| | | | | |
|---|---|---|---|---|
| 5,009,477 A | * | 4/1991 | Alferness et al. | 385/17 |
| 5,539,848 A | * | 7/1996 | Galloway | 385/89 |
| 5,636,298 A | * | 6/1997 | Jiang et al. | 385/14 |
| 5,943,463 A | * | 8/1999 | Unuma et al. | 385/119 |
| 6,798,932 B2 | * | 9/2004 | Kuhara et al. | 385/14 |
| 2002/0154879 A1 | * | 10/2002 | Yasuda et al. | 385/132 |
| 2004/0033007 A1 | * | 2/2004 | Ohtsu et al. | 385/14 |

FOREIGN PATENT DOCUMENTS

JP        10-293219        11/1998

* cited by examiner

*Primary Examiner*—Rodney Bovernick
*Assistant Examiner*—Mike Stahl
(74) *Attorney, Agent, or Firm*—Drinker Biddle & Reath LLP

(57) ABSTRACT

An optical device 1 has a photodetecting element 6, an optical waveguide layer 4 containing core portions 4a to 4c extending in directions crossing a layer thickness direction and a clad portion 4h covering the core portions 4a to 4c, and an optical waveguide substrate 2 having the end face 4g of the core portion 4c optically coupled to the photodetecting element 6 on the side surface 2a thereof. The optical waveguide substrate 2 has substrates 3 and 5 disposed so that the principal surfaces 3a and 5a face each other. The optical waveguide layer 4 is provided between the substrate 3 and the substrate 5. The photodetecting element 6 is mounted on the mount area 2c on the side surface 2a of the optical waveguide substrate 2. The mount area 2c is set to contain the end face 4g of the core portion 4c, a part of the side surface 3b of the substrate 73 and a part of the side surface 5b of the substrate 5. Accordingly, in the optical device, the optical coupling efficiency between a semiconductor optical element such as a light emission element and a photodetecting element and an optical waveguide can be enhanced.

18 Claims, 29 Drawing Sheets

Fig.1
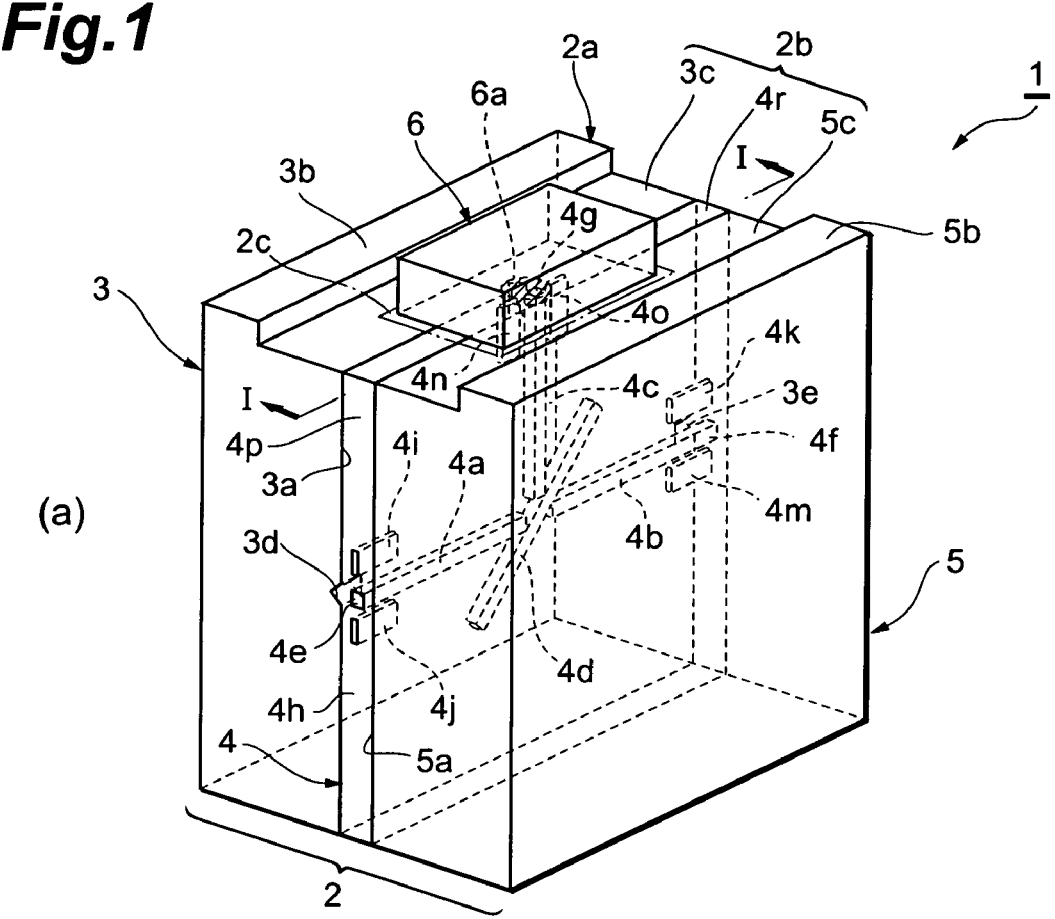
(a)
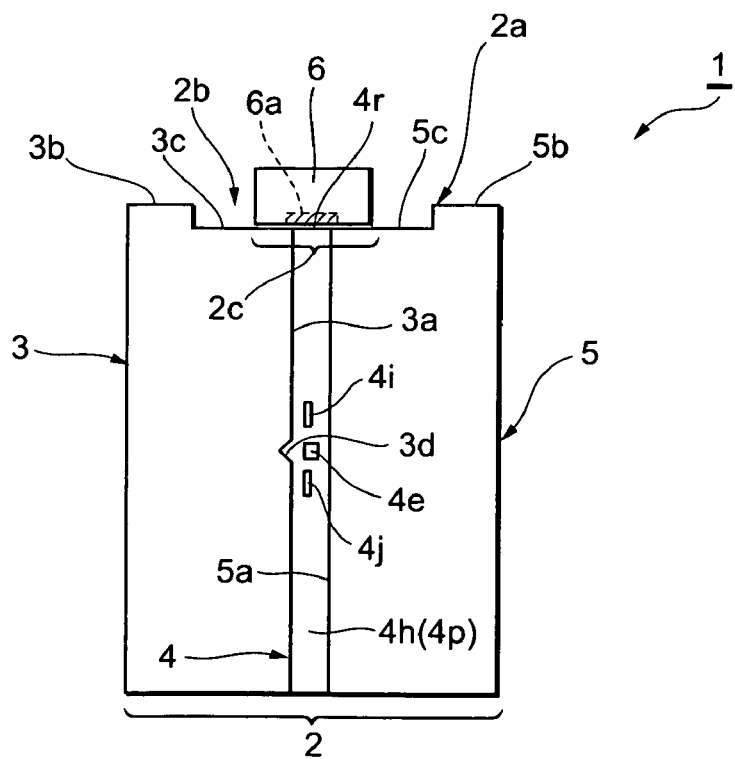
(b)

Fig.2
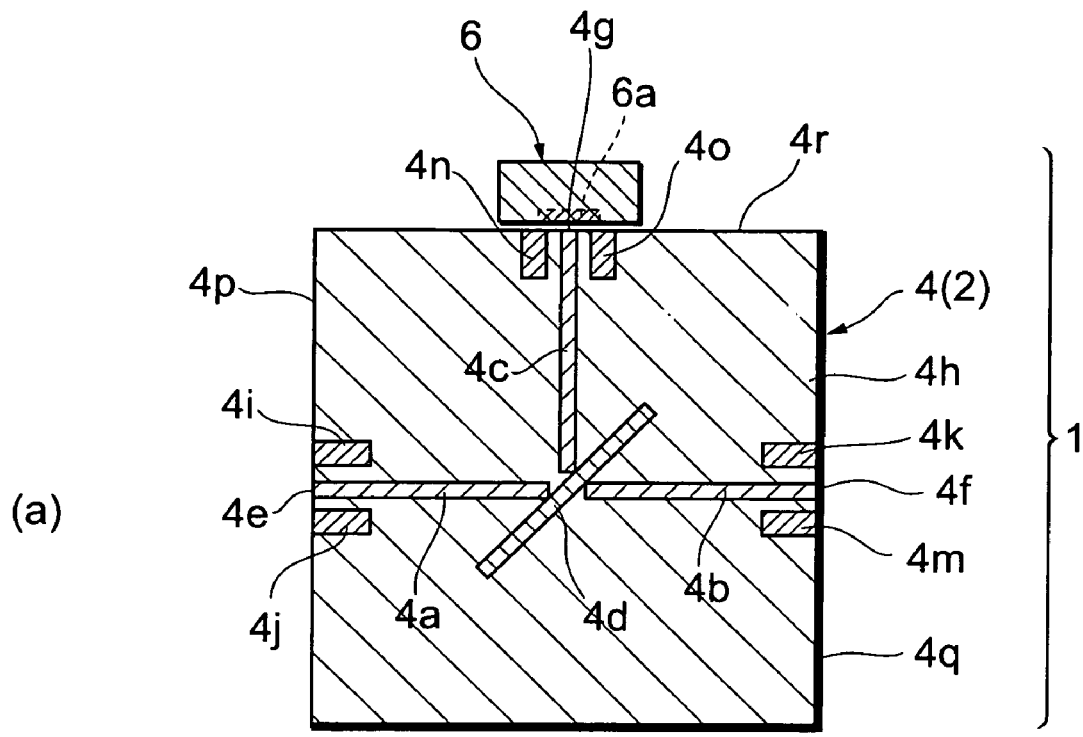
(a)
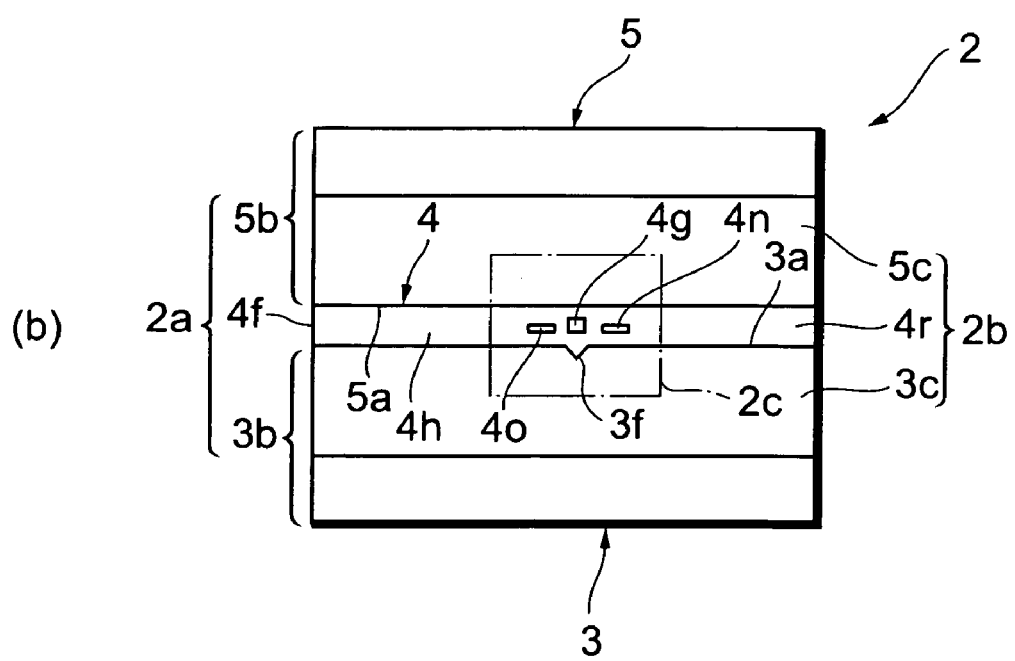
(b)

Fig.13
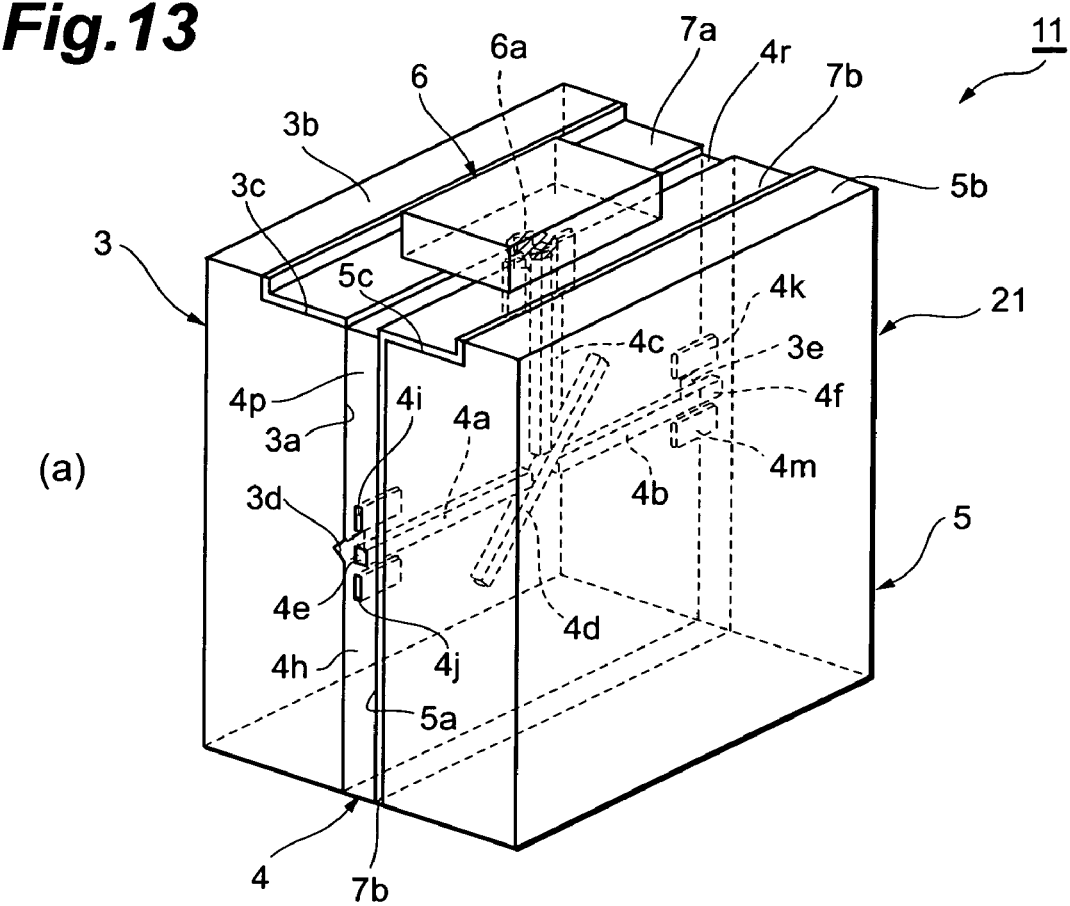
(a)
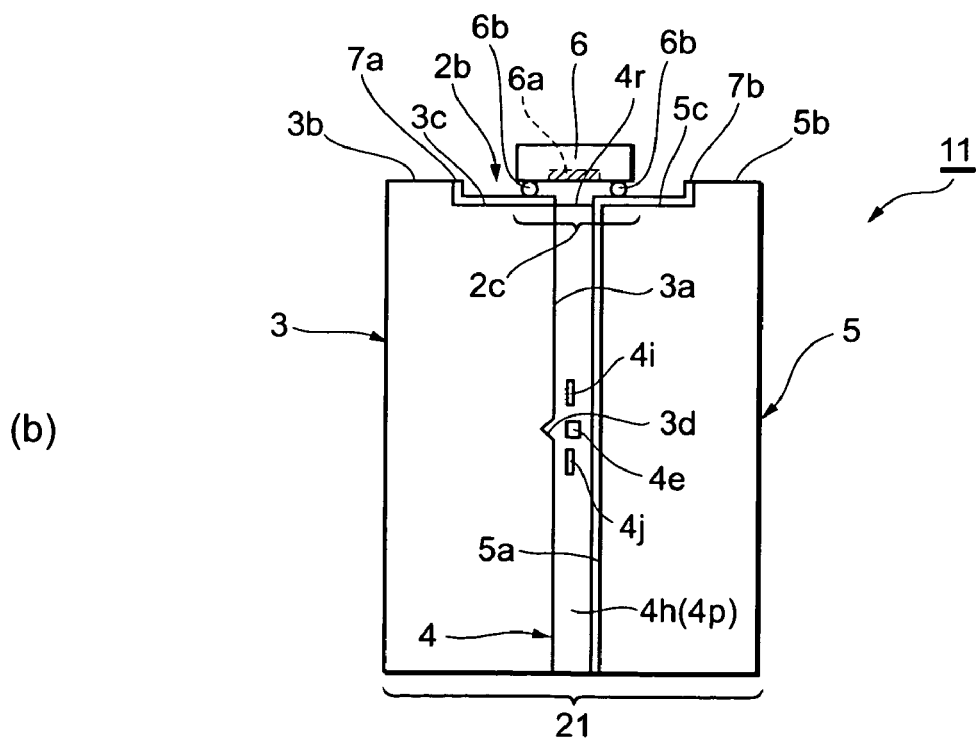
(b)

Fig.16
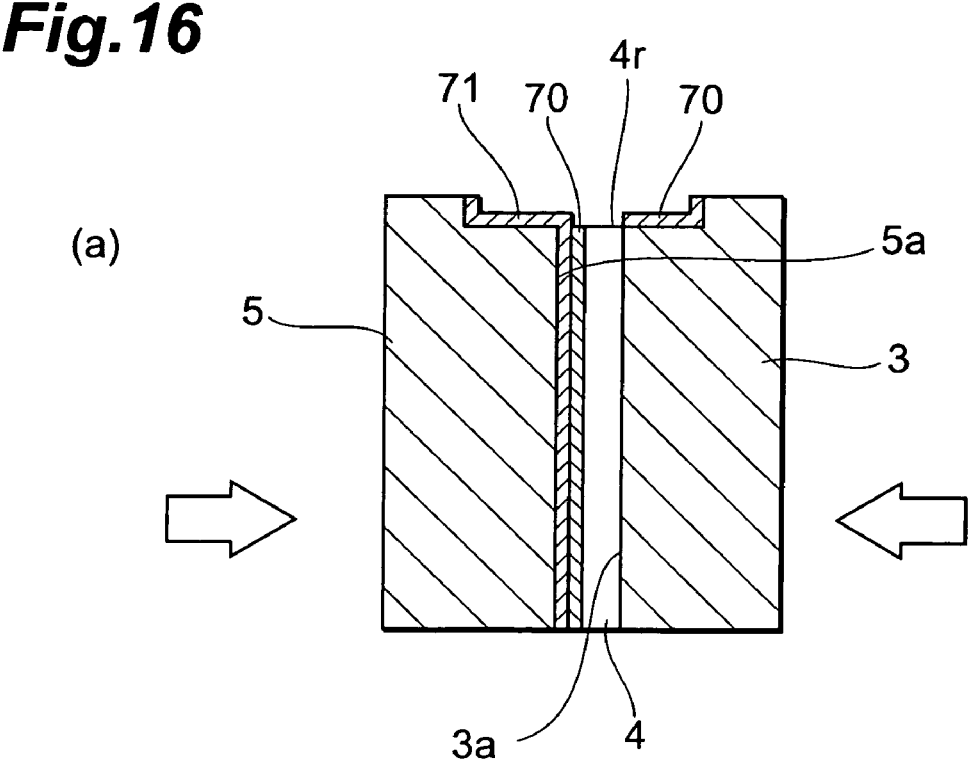
(a)
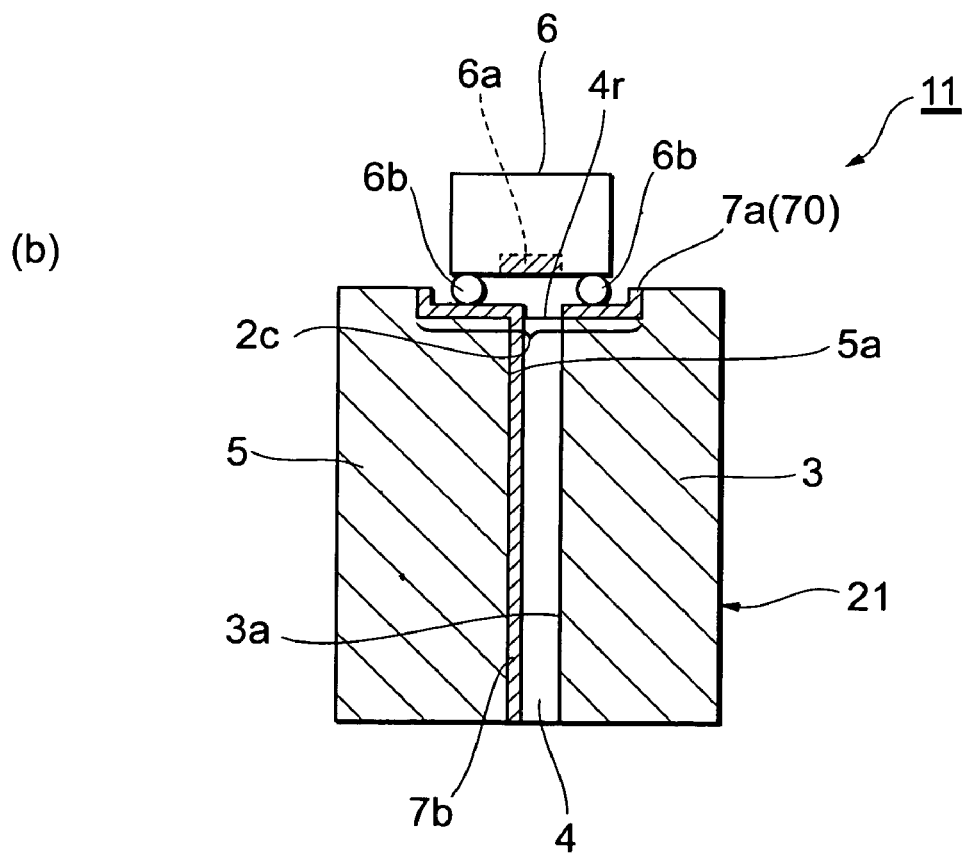
(b)

Fig.18
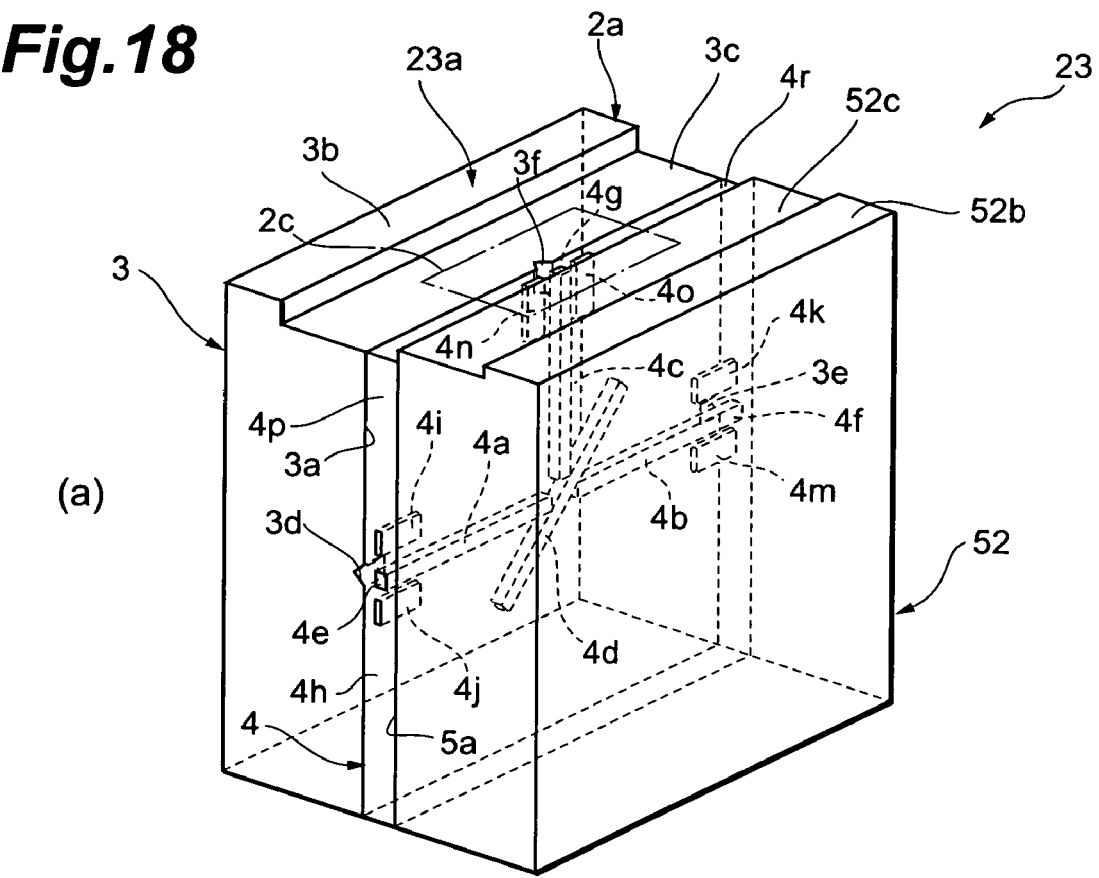
(a)
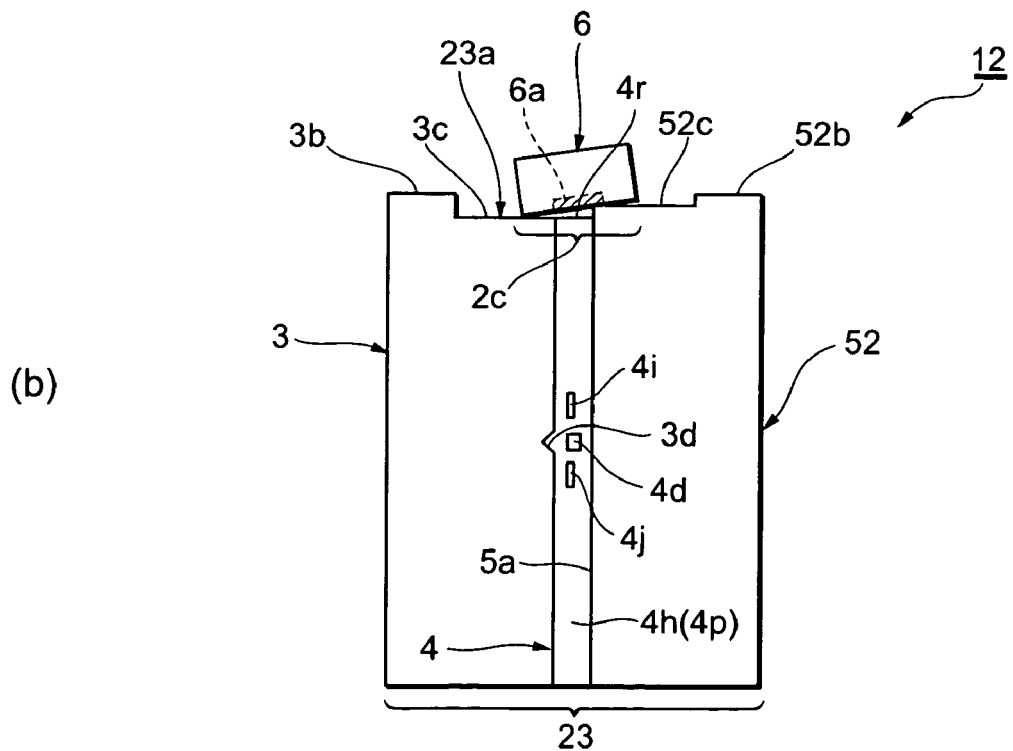
(b)

OPTICAL DEVICE

FIELD OF THE INVENTION

The present invention relates to an optical device having a semiconductor optical element and an optical waveguide.

RELATED BACKGROUND OF THE INVENTION

In an optical communication field, an optical waveguide substrate having an optical waveguide coupled to an optical fiber is used to make signal light incident to an optical transmission medium such as an optical fiber or the like or take out signal light propagating through the optical transmission medium. For example, an optical waveguide coupler described in Japanese Published Unexamined Patent Application No. 10-293219 has an optical waveguide on a quartz type substrate, filters or reflecting mirrors are embedded in plural dicing grooves formed in the optical waveguide, and photodetecting elements or light emitting elements adhesively attached onto the grooves.

However, the optical waveguide coupler disclosed in Japanese Published Unexamined Patent Application No. 10-293219 has the following problem. That is, in the optical waveguide coupler, when light guided along the optical waveguide is detected by the photodetecting element, the light is detected via a quartz type substrate (clad) around the optical waveguide. Or, when light from a light emitting element is made incident into the optical waveguide, it is made incident via the quartz type substrate (clad) around the optical waveguide. Accordingly, light is scattered by the quartz type substrate (clad) around the optical waveguide, and thus the optical coupling efficiency (that is, the light take-out efficiency or incident efficiency) between each of the light emitting element and the photodetecting element and the optical waveguide is lowered.

The present invention has been implemented in view of the foregoing problem, and has an object to provide an optical device that can enhance the optical coupling efficiency between a semiconductor optical element such as the light emitting element or the photodetecting element and the optical waveguide.

SUMMARY OF THE INVENTION

In order to solve the problem, the optical device according to the present invention has a semiconductor optical element, and an optical waveguide substrate having a core portion extending in a direction crossing a layer thickness direction and an optical waveguide layer containing a clad portion covering the core portion, an end face of the core portion that is optically coupled to the semiconductor optical element being provided to the side surface of the optical waveguide substrate, wherein the optical waveguide substrate further has first and second substrates disposed so that the principal surfaces thereof are facing each other, the optical waveguide layer is provided between the first substrate and the second substrate, the semiconductor optical element is disposed on a mount area of the side surface of the optical waveguide substrate, and the mount area contains the end face of the core portion, a part of the side surface of the first substrate and a part of the side surface of the second substrate.

In the above-described device, for example, the mount area in which a semiconductor optical element such as the photodetecting element, the light emitting element or the like is provided to the side surface of the optical waveguide substrate, and the mount area contains the end face of the core portion serving as the optical waveguide and a part of the side surface of each of the first and second substrates. With this construction, a space in which the semiconductor optical element can be mounted can be secured on the side surface of the optical waveguide substrate, and the semiconductor optical element strides over the end face of the core portion, whereby the semiconductor optical element and the end face of the core portion can be optically coupled to each other without a clad portion. Therefore, according to the optical device, the optical coupling efficiency between the semiconductor optical element and the core portion (optical waveguide) can be enhanced.

Furthermore, the mount area may be contained in the bottom surface of a recess portion formed on the side surface of the optical waveguide substrate, whereby an adhesive agent layer, a refractive index matching resin layer or the like can be easily formed in the recess portion formed on the side surface of the optical waveguide substrate.

Furthermore, the optical device may be constructed so that the recess portion of the optical waveguide substrate contains a step portion formed along the edge of the principal surface in each of the first and second substrates. When the first and second substrates are cut out from a wafer, a groove having a rectangular section along a cutting-plane line is formed in advance, whereby such a step portion can be easily formed. Therefore, according to the optical device, the recess portion containing the mount area in the bottom surface thereof can be easily formed on the side surface of the optical waveguide substrate.

Furthermore, the optical device may be constructed so that the optical waveguide substrate has, on the side surface, a first mark indicating the position of the end face in a direction along the edge of the principal surface of each of the first and second substrates. In the optical waveguide layer, there is a case where both the core portion and the clad portion are formed of transparent materials to light. In such a case, even when the end face of the core portion is exposed from the side surface of the optical waveguide layer, it is difficult to visually recognize the end face. However, if it is impossible to grasp the accurate position of the end face of the core portion, some displacement may occur between the relative positions of the end face of the core portion and the semiconductor optical element. When the relative position precision between the end face of the core portion and the semiconductor optical element is low, the optical coupling efficiency between the end face and the semiconductor optical element is suppressed to a small level. On the other hand, according to the above-described optical device, first marks for indicating the positions of the end faces of core portions in the direction along the edge of the principal surface of the first and second substrates is provided to the side surface of the optical waveguide substrate, whereby the positions of the end faces of the core portions in the direction along the edge of the principal surface can be easily and accurately visually recognized, and the semiconductor optical element can be secured with high positional precision. Therefore, according to the optical device, the precision of the relative position between the semiconductor optical element and the end face of the core portion can be enhanced, so that the optical coupling efficiency between the semiconductor optical element and the end face of the core portion can be further enhanced.

Furthermore, the optical device may be constructed so that the first mark includes a groove formed on the principal surface of the first substrate so as to reach the side surface of the optical waveguide substrate. Accordingly, the first mark that can be easily formed and accurately visually recognized can be provided to the side surface of the optical waveguide substrate.

Furthermore, the optical device may be constructed so that the optical waveguide layer has, on the side surface, a second mark indicating the position of the end face in the layer thickness direction. Accordingly, the position of the end face of the core portion in the layer thickness direction can be easily and accurately visually recognized, and the semiconductor optical element can be secured with high positional precision. Therefore, according to the optical device, the precision of the relative position between the semiconductor optical element and the end face of the core portion can be enhanced, so that the optical coupling efficiency between the semiconductor optical element and the end face of the core portion can be further enhanced.

Furthermore, the optical device may be constructed so that the second mark includes a film that contains a material different from that of the clad portion and embedded in the clad portion so as to be exposed from the side surface of the clad portion. Accordingly, the second mark that can be clearly visually recognized can be formed on the side surface of the optical waveguide layer.

Furthermore, the optical device may be constructed so that the optical waveguide substrate has a step between the side surfaces of the first and second substrates in the mount area. When a semiconductor optical element is mounted on such a mount area, the semiconductor optical element is inclined with respect to the optical axis of to-be-detected light emitted from the end face of the core portion by the step between the side surfaces of the first and second substrates. Therefore, according to the optical device, when a photodetecting element is used as the semiconductor optical element, the photodetecting face of the photodetecting element is preferably inclined with respect to the optical axis of the to-be-detected light, thereby suppressing Fresnel reflection in which reflected light of the to-be-detected light from the photodetection face is made incident to the core portion again. Furthermore, a gap occurs between the semiconductor optical element and the end face of the core portion by the step between the side surfaces of the first and second substrates, so that refractive index matching resin can be easily poured into this gap.

Furthermore, the optical device may be constructed so that the optical waveguide substrate further has a wiring pattern electrically connected to the semiconductor optical element on the side surface of each of the first and second substrates in the mount area. Accordingly, electrical connection means of the semiconductor optical element can be secured, and the semiconductor optical element can be directly mounted on the side surface of the optical waveguide substrate.

Furthermore, the optical device may further include a wiring substrate having a wiring pattern electrically connected to the semiconductor optical element between the side surface of the optical waveguide substrate and the semiconductor optical element, and the wiring substrate has a light passing portion at the position corresponding to the end face of the core portion. The light passing portion may be an opening (through hole) formed in the wiring substrate, or a lens embedded in the wiring board. Accordingly, the semiconductor optical element can be preferably mounted on the side surface of the optical waveguide substrate, and also the semiconductor optical element and the end face of the core portion can be preferably optically coupled to each other via the light passing portion provided to the wiring substrate.

Furthermore, the optical device may be constructed so that the optical waveguide substrate further has a metal layer for joining the second substrate and the optical waveguide layer to each other between the second substrate and the optical waveguide layer. When the optical waveguide substrate is manufactured, the optical waveguide substrate having the optical waveguide layer between the first and second substrates can be preferably manufactured by joining the surface of the optical waveguide layer formed on the principal surface of the first substrate to the principal surface of the second substrate. In this case, a metal film is formed on each of both the surface of the optical waveguide layer and the principal surface of the second substrate, and these metal films are bonded by the thermo compression bonding to each other, whereby the optical waveguide layer and the second substrate can be firmly joined to each other. Therefore, according to the optical device, there can be implemented the optical waveguide substrate in which the optical waveguide layer and the second substrate are firmly joined to each other.

Furthermore; an optical device according to the present invention is characterized by including semiconductor optical elements of n (n represents an integer of 2 or more) and an optical waveguide substrate having optical waveguide layers of n layers that contain core portions extending in a direction crossing a layer thickness direction and a clad portion covering the core portions, and laminated in the layer thickness direction, and having on a side surface thereof an end face of the core portion of each optical waveguide layer optically coupled to each of the semiconductor optical elements of n, wherein the optical waveguide substrate further has substrates of (n+1) that are laminated in the layer thickness direction so as to be alternated with the optical waveguide layers of n layers, the semiconductor optical elements of n are respectively mounted on mount areas of n on the side surface of the optical waveguide substrate, and each of the mount area of n contains the end face of the core portion of the corresponding optical waveguide layer of the optical waveguide layers of n layers and a part of the side surface of each of the substrates disposed at both sides of the optical waveguide layer.

In the above-described optical device, n mount areas in which n semiconductor optical elements are mounted are provided on the side surface of the optical waveguide substrate, and also each of the n mount areas contains the end face of the core portion of the corresponding optical waveguide layer out of the optical waveguide layers of n layers and a part of the side surface of each of the substrates disposed at both sides of the optical waveguide layer. With this constriction, a space in which semiconductor optical elements of n can be mounted can be secured on the side surface of the optical waveguide substrate, and also each of the n semiconductor optical elements strides over the end face of the core portion of the corresponding optical waveguide layer, whereby the end face of the core portion of each optical waveguide layer and each semiconductor optical element can be optically coupled to each other without a clad portion. Therefore, according to the optical device, the optical coupling efficiency between the core portion of each optical waveguide layer and each semiconductor optical element can be enhanced. Furthermore, the optical waveguide layers of n layers are laminated in the layer thickness direction, whereby many optical waveguides can be integrated in the optical device and also the optical device can be miniaturized.

Furthermore, an optical device according to the present invention is characterized by including plural semiconductor optical elements, and an optical waveguide substrate having an optical waveguide layer containing core portions extending in directions crossing a layer thickness direction and a clad portion covering the core portions, and having plural end faces of the core portions optically coupled to the plural semiconductor optical elements on the side surfaces thereof, wherein the optical waveguide substrate further has first and second substrates disposed so that the principal surfaces thereof face each other, the optical waveguide layer is provided between the first substrate and the second substrate, the plural semiconductor optical elements are mounted on plural mount areas on the side surface of the optical waveguide substrate, and each of the plural mount areas contains at least one end face of the plural end faces of the core portions, a part of the side surface of the first substrate and a part of the side surface of the second substrate.

In the above-described optical device, the plural mount areas in which the plural semiconductor optical elements are mounted are provided on the side surface of the optical waveguide substrate, and each of the plural mount areas contains at least one end face of the plural end faces of the core portion, a part of the side surface of the first substrate and a part of the side surface of the second substrate. With this construction, the space in which the plural semiconductor optical elements can be mounted can be secured on the side surface of the optical waveguide substrate, and also each of the plural semiconductor optical elements strides over the corresponding end face, whereby each semiconductor optical element and each end face of the core portion can be optically coupled to each other without a clad portion. Therefore, according to the optical device described above, the optical coupling efficiency between each semiconductor optical element and the core portion can be enhanced. Furthermore, the plural semiconductor optical elements are disposed on the side surface of the optical waveguide substrate, whereby many semiconductor optical elements can be integrated in the optical device and also the optical device can be miniaturized.

In each optical device described above, the case that plural (or n) semiconductor optical elements are provided means a case where there are provided a plurality of (or n) semiconductor optical elements each of which has one active region (a photosensitive region, a light emitting region or the like) and a case where there is provided at least one semiconductor optical element array in which plural semiconductor optical elements as described above are integrally formed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, and given by way of illustration only, since various changes and modifications within the spirit and scope of the invention will be apparent to those skilled in the art from this detailed description.

BRIEF DESCRIPTION OF THE DRAWINGS

FIG. 1(a) is a perspective view showing the construction of an optical device according to a first embodiment; FIG. 1(b) is a side view of the optical device shown in FIG. 1(a) which is viewed in a direction along an optical waveguide (core portion) provided to the optical device;

FIG. 2(a) is a side cross-sectional view showing the cross-section (that is, the cross-section containing the optical waveguide (core portion) provided to the optical device) along I-I line of the optical device shown in FIG. 1(a); FIG. 2(b) is a side view showing the optical device shown in FIG. 1(a) which is viewed in a direction along the optical waveguide (core portion) provided to the optical device;

FIG. 13(a) is a perspective view showing the construction of a second embodiment of the optical device of the present invention; FIG. 13(b) is a side view of the optical device shown in FIG. 13(a) which is viewed in a direction along the core portion provided to the optical device;

FIG. 16(a) and FIG. 16(b) are side cross-sectional views showing the manufacturing process of the optical device according to the second embodiment in sequence;

FIG. 18(a) is a perspective view showing the construction of an optical waveguide substrate as a second modification of the optical device according to the first embodiment; FIG. 18(b) is a side view showing the construction of an optical device according to a second modification;

DESCRIPTION OF THE PREFERRED EMBODIMENTS

Figure 3:
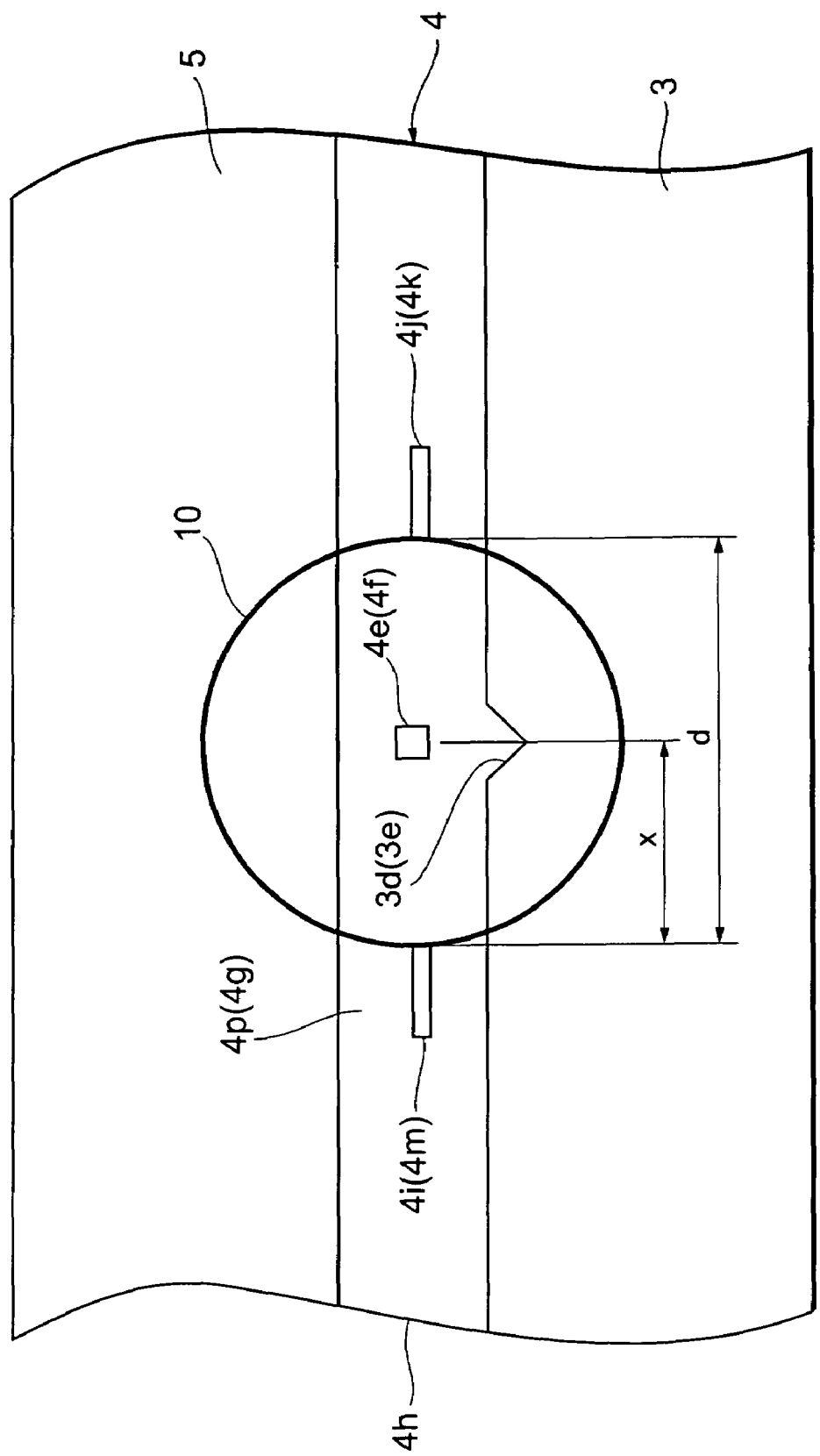
FIG. 3 is a diagram showing a state that an optical fiber is coupled to the end face of the core portion.
Figure 4:
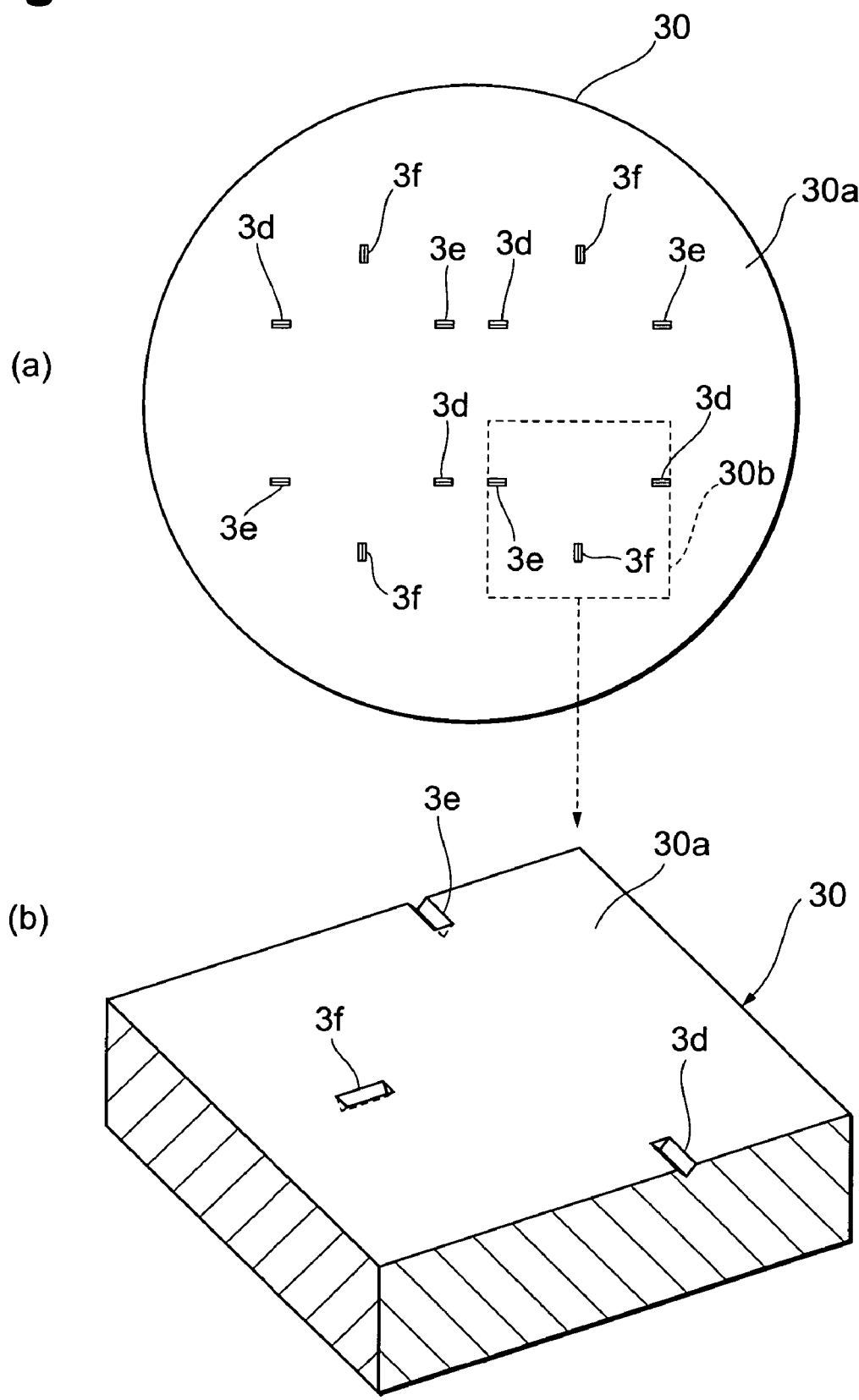
FIG. 4(a) and FIG. 4(b) are diagrams showing the manufacturing process of an optical waveguide substrate according to the first embodiment.

An embodiment of an optical device according to the present invention will be described hereunder in detail with reference to the accompanying drawings. In the description of the drawings, the same elements are represented by the same reference numerals, and overlapping description thereof is omitted.

First Embodiment

FIG. 1 and FIG. 2 are diagrams showing the construction of an optical device according to the present invention. FIG. 1(a) is a perspective view showing the construction of an optical device according to an embodiment. FIG. 1(b) is a side view showing an optical device 1 shown in FIG. 1(a) which is viewed in a direction along optical waveguides (core portions) 4a and 4b provided to the optical device 1. FIG. 2(a) is a side cross-sectional view showing the cross-section along I-I line of the optical device 1 shown in FIG. 1(a) (that is, the cross-section containing optical waveguides (core portions) 4a to 4c provided to the optical device 1). FIG. 2(b) is a side view showing the optical device 1 shown in FIG. 1(a) when it is viewed in a direction along the optical waveguide (core portion) 4c provided to the optical device 1. In order to make the understanding easy, a semiconductor optical element (photodetecting element) 6 provided to the optical device 1 is omitted from the illustration of FIG. 2(b).

Referring to FIG. 1 and FIG. 2, the optical device 1 of this embodiment has the optical waveguide substrate 2 and the photodetecting element 6. The optical waveguide substrate 2 is a so-called buried type optical waveguide substrate, and it has two substrates 3 and 5 and an optical waveguide layer 4 disposed between the substrates 3 and 5. The substrates 3 and 5 correspond to the first and second substrates of this embodiment.

The substrates 3 and 5 have principal surfaces 3a and 5a respectively, and the planar shapes thereof (the shapes viewed in directions perpendicular to the principal surfaces 3a and 5a respectively) are set to rectangular shapes. The substrates 3 and 5 are disposed so that the principal surfaces 3a and 5a face each other. A step portion 3c is formed on one side surface 3b of the substrate 3 so as to extend along the edge of the principal surface 3a on the side surface 3b. Likewise, a step portion 5c is formed on one side surface 5b of the substrate 5 so as to extend along the edge of the principal surface 5a on the side surface 5b. The step portions 3c and 5c and the side surface 4r of the optical waveguide layer 4 are aligned with one another on the same plane, and have the bottom surface of a recess portion 2b on the side surface 2a of the optical waveguide substrate 2.

Grooves 3d to 3f are formed on the principal surface 3a of the substrate 3. The grooves 3d to 3f serve as first marks indicating the positions of the end faces 4e to 4g in the directions along the edges of the principal surfaces 3a and 3a. The end faces 4e to 4g correspond to the end faces of core portions 4a to 4c (described later) provided in the optical waveguide layer 4. That is, the grooves 3d to 3f are formed so that the longitudinal directions thereof are set to the direction intersecting the edge of the principal face 3a, and one ends thereof reach the positions corresponding to the end faces 4e to 4g on the side surface of the optical waveguide substrate 2 so as to be visually recognizable from the side of the optical waveguide substrate 2. The grooves 3d to 3f are preferably designed to have a clear V-shaped section at the center positions thereof. However, if the grooves 3d to 3f are designed excessively deep, unevenness of coating occurs when a clad portion 4h (described later) of the optical waveguide layer 4 is coated, and thus the depth of the grooves 3d to 3f preferably ranges from 20 µm to 50 µm, and it is particularly preferably equal to about 30 µm. Furthermore, with respect to the width of the grooves 3d to 3f, for example, when the grooves 3d to 3f are formed by anisotropic etching using an alkali solution, it is determined in consideration of the crystal axis direction on the principal surface 3a of the substrate 3.

The substrates 3 and 5 are formed of material such as silicon, polyimide, glass, quartz, glass epoxy, ceramic or the like. In the case where the optical waveguide layer 4 is formed of a polymer, the optical waveguide layer 4 is contracted when it is thermally cured, and thus it is preferable that the substrates 3 and 5 are also formed of the same kind of material as the optical waveguide layer 4 in order to make the coefficient of thermal expansion match among them. However, if an Si substrate is used, the Si substrate itself is barely thermally contracted, and thus the alignment precision of the substrate as a whole can be maintained. Furthermore, the "first mark" such as the V grooves or the like can be efficiently formed by wet etching, and the positional precision is excellent. In the case of the Si substrate, it is impossible to perfectly nullify the difference in thermal expansion coefficient. However, as a countermeasure, a layer having an intermediate thermal expansion coefficient between the Si substrate and the optical waveguide layer 4 may be provided between the Si substrate and the optical waveguide layer 4, whereby the difference in stress at the thermal contraction can be reduced. When attention is paid to the optical waveguide characteristic, the substrate is preferably formed of the same kind of material as the optical waveguide layer 4 in order to match the thermal expansion coefficient. However, when the overall of the device is considered like the alignment precision, formation of the alignment marks (first marks, the grooves 3d to 3f), etc., the Si substrate is further preferable as the substrates 3 and 5. Furthermore, when the substrates 3 and 5 and the optical waveguide layer 4 are formed of different materials (for example, a silicon substrate or glass substrate is used while the optical waveguide layer 4 of a polyimide is used), in order to suppress warp of the optical waveguide layer 4 due to the contraction of the optical waveguide layer 4, it is preferable that the thickness of the substrates 3 and 5 (particularly the substrate 3) is set to a relatively large value (for example, from not less than 300 μm to not more than 1 mm in thickness).

The optical waveguide layer 4 contains core portions 4a to 4c for waveguiding light, and it is provided between the principal surface 3a of the substrate 3 and the principal surface 5a of the substrate 5. The optical waveguide layer 4 is designed so that the planar shape thereof is rectangular as in the case of the substrates 3 and 5, and it has a side surface 4r contained in the side surface 2a of the optical waveguide substrate 2 and side surfaces 4p and 4q (see FIG. 2(b)) extending along a direction crossing the side surface 4r.

Furthermore, the optical waveguide layer 4 has a clad portion 4h and core portions 4a to 4c larger in refractive index than the clad portion 4h. The clad portion 4h is formed in a layer form on the principal surface 3a of the substrate 3 (that is, between the principal surface 3a of the substrate 3 and the principal surface 5a of the substrate 5), and the core portions 4a to 4c are covered by the clad portion 4h. The core portions 4a to 4c extend in the direction crossing the thickness direction of the optical waveguide layer 4 (the direction vertical to the principal surfaces 3a and 5a), in other words, the direction along the principal surfaces 3a and 5a. In this embodiment, the core portions 4a and 4b are formed so that the longitudinal directions thereof are set to the direction crossing the side surfaces 4p and 4q, and the core portion 4c is formed so that the longitudinal direction thereof is set to the direction crossing the side surface 4r. One end of the core portion 4a is exposed at the side surface 4p, and serves as the end face 4e. One end of the core portion 4b is exposed at the side surface 4q, and serves as the end face 4f. One end of the core portion 4c is exposed at the side surface 4r, and serves as the end face 4g. The other end of the core portion 4a and the other end of the core portion 4b are facing each other in the optical waveguide layer 4, and the other end of the core portion 4c is disposed to face the gap between the other ends of the core portions 4a and 4b.

Furthermore, the optical waveguide layer 4 contains a wavelength filter 4d. The wavelength filter 4d is an optical part for selectively reflecting the wavelength components contained in light in accordance with the wavelength, and it is covered by the clad portion 4h. The wavelength filter 4d has a reflecting face for selectively reflecting light in accordance with the wavelength, and it is disposed along the principal surface 3a between the gap between the core portions 4a and 4b so that light waveguided by the core portion 4a is reflected to the core portion 4c at the reflecting face (on the contrary, the light waveguided by the core portion 4c is reflected to the core portion 4a at the reflecting face). For example, the wavelength filter 4d has a base portion and a dielectric multi-layered film provided to the reflecting face side of the base portion. The dielectric multi-layered film is formed by laminating plural dielectric layers having a predetermined thickness and refractive index, and it can selectively reflect light in accordance with the wavelength.

The core portions 4a to 4c and the clad portion 4h of the optical waveguide layer 4 are formed so as to contain a polymer containing as a main agent at least one kind of organic materials such as a polyimide, silicone, epoxy, acrylate, polymethylmethacrylate (PMMA), etc. Or, in order to achieve the optimal transmission characteristic corresponding to the wavelength of light to be waveguided, the core portions 4a to 4c and the clad portion 4h may be formed so as to contain a polymer containing as a main agent deuteride (for example, deuterated silicone) achieved by substituting H of C-H groups of these organic materials by deuterium, or fluoride (for example, fluorinated polyimide) achieved by substituting H of C-H groups by fluorine (in the following description, these organic materials or polymer containing as a main agent deuterides thereof, fluorides thereof are merely "a polymer such as a polyimide or the like"). It is preferable that the core portions 4a to 4c and the clad portion 4h contain a polyimide that has a higher glass transition temperature and excellent heat resistance in these organic materials. When the core portions 4a to 4c and the clad portion 4h contain a polyimide, the reliability of the optical waveguide layer 4 can be kept for a long period, and it can endure heat when soldering is carried out. More preferably, the core portions 4a to 4c and the clad portion 4h may contain fluorinated polyimide in consideration of optical transmission, refractive index characteristic, etc.

Furthermore, when the core portions 4a to 4c and the clad portion 4h are formed of a polymer such as a polyimide or the like, the core portions 4a to 4c and the clad portion 4h are contracted when they are thermally cured, and thus it is preferable that the wavelength filter 4d contains a polymer such as a polyimide or the like as in the case of the core portions 4a to 4c and the clad portion 4h. Furthermore, more preferably, the wavelength filter 4d, the core portions 4a to 4c and the clad portion 4h may contain the same kind of material. For example, when the core portions 4a to 4c and the clad portion 4h are formed of a polymer containing fluorinated polyimide as a main agent, it is preferable that the wavelength filter 4d is formed of a polymer containing fluorinated polyimide as a main agent.

Here, the optical waveguide layer 4 further has films 4i to 4o. The films 4i to 4o serve as second marks indicating the positions of the end faces 4e to 4g of the core portions 4a to 4c in a layer thickness direction of the optical waveguide layer 4. The films 4i to 4o contain a material (for example, metal) different from the clad portion 4h, it is embedded in the clad portion 4h so as to expose from the side surfaces 4p to 4r of the clad portion 4h.

Specifically, the films 4i and 4j are provided in the vicinity of the end face 4e of the core portion 4a so as to be arranged in the direction crossing both the layer thickness direction of the optical waveguide layer 4 and the longitudinal direction of the core portion 4a and so that the core portion 4a is disposed between the film 4i and the film 4j. The films 4i and 4j are formed in the same layer as the core portion 4a in the optical waveguide layer 4, and one ends thereof are exposed at the side surface 4p so as to be visually recognizable from the side surface 4p side of the optical waveguide layer 4. The films 4k and 4m are provided in the vicinity of the end face 4f of the core portion 4b so as to be arranged in the direction crossing both the layer thickness direction of the optical waveguide layer 4 and the longitudinal direction of the core portion 4b and so that the core portion 4b is disposed between the film 4k and the film 4m. The films 4k and 4m are formed in the same layer as the core portion 4b inside the optical waveguide layer 4, and one ends thereof are exposed at the side surface 4q so as to be visually recognizable from the side surface 4q side of the optical waveguide layer 4. Furthermore, the films 4n and 4o are provided in the vicinity of the end face 4g of the core portion 4c so as to be arranged in the direction crossing both the layer thickness direction of the optical waveguide layer 4 and the longitudinal direction of the core portion 4c and so that the core portion 4c is disposed between the film 4n and the film 4o. The films 4n and 4o are formed in the same layer as the core portion 4c inside the optical waveguide layer 4, and one ends thereof are exposed at the side surface 4r so as to be visually recognizable from the side surface 4r side of the optical waveguide layer 4.

The films 4i to 4o are positioned in the same layer as the core portions 4a to 4c, and thus when they are formed so as to be excessively near to the core portions 4a to 4c, they affect propagation of light in the core portions 4a to 4c. Accordingly, it is preferable to provide a sufficient interval (for example, 20 μm) between the film 4i to 4o and the core portion 4a to 4c.

The interval between the core portion 4a and the films 4i and 4j and the interval between the core portion 4b and the films 4k and 4m are preferably set in accordance with the diameter of the optical fiber coupled with the end faces 4e and 4f of the core portions 4a and 4b. Here, FIG. 3 is a diagram showing the state that the optical fiber is coupled to the end faces 4e and 4f. In FIG. 3, a circumference 10 represents the outer edge of the optical fiber. For example, the diameter d of a general single mode optical fiber is equal to 125 μm. Accordingly, when the interval between the core portion 4a and the films 4i and 4j (the interval between the core portion 4b and the films 4k and 4m) x is set to a half of the diameter d as an example, that is, 62.5 μm, the outer circumference 10 of the fiber end and the end portion of the film 4i to 4m are positionally coincident with each other, so that the alignment of the optical fiber can be preferably performed with high precision. Furthermore, the films 4i to 4m can be used to check the alignment precision after the coupling of the optical fiber.

For example, Al, Ti, Cr, WSi or the like may be used as the material of the films 4i to 4o. When the thickness of the films 4i to 4o is relatively large, the films 4i to 4o can be easily visually recognized on the side surface 4p to 4r. However, as described later, the films 4i to 4o are formed by dry etching or the like, and thus when the etching condition is considered, the preferable thickness of the films 4i to 4o ranges from 0.2 μm to 1.5 μm.

The photodetecting element 6 is a semiconductor optical element of this embodiment. For example, a photodiode is preferably used as the photodetecting element 6. The photodetecting element 6 of this embodiment has a photodetecting area (photodetecting face) 6a on the surface thereof. Furthermore, the photodetecting element 6 is mounted on the mount area 2c (see FIG. 2(b)) of the side surface 2a so that the photodetecting area 6a faces the side surface 2a of the optical waveguide substrate 2. In the side surface 2a of the optical waveguide substrate 2, the mount area 2c is set in an area containing the end face 4g of the core portion 4c, a part of the side surface 3b of the substrate 3 and a part of the side surface 5b of the substrate 5. Accordingly, the photodetecting element 6 strides over the end face 4g of the core portion 4c and it is mounted over the area from the side surface 3b of the substrate 3 to the side surface 5b of the substrate 5. The photodetecting element 6 is positioned so that the photodetecting area 6a and the end face 4g of the core portion 4c are optically coupled to each other.

The photodetecting element 6 is fixed to the optical waveguide substrate 2 by an adhesive agent layer (not shown) provided on the side surface 2a. The adhesive agent layer is formed of transparent resin, for example, and it fixes the photodetecting element 6 and the optical waveguide substrate 2 to each other, and functions to match the refractive index between the photodetecting area 6a and the end face 4g by filling the adhesive agent layer in the gap between the photodetecting area 6a of the photodetecting element 6 and the end face 4g of the core portion 4c. This adhesive agent layer is formed by pouring transparent resin into the recess portion 2b of the optical waveguide substrate 2 and curing it. Accordingly, the mount area 2c is preferably contained in the bottom surface of the recess portion 2b.

A back-side incident photodiode as an example is preferably used as the photodetecting element 6 of this embodiment. Furthermore, the semiconductor optical element provided to the optical device 1 is not limited to the photodetecting element 6, a light emitting element (for example, a laser diode, LED or the like) may be used. A optical transmission medium such as an optical fiber or the like or a semiconductor optical element different from the photodetecting element 6 is coupled to the end face 4e of the core portion 4a and the end face 4f of the core portion 4b.

The method of manufacturing the optical waveguide substrate 2 of the thus constructed optical device 1 will be described. FIGS. 4 to 12 are diagrams sequentially showing the manufacturing process of the optical waveguide substrate 2 according to this embodiment.

First, a wafer 30 having a main principal surface 30a is prepared as shown in FIG. 4(a). FIG. 4(a) is a plan view showing the appearance of the wafer 30, and FIG. 4(b) is a perspective view when a part 30b of the wafer 30 shown in FIG. 4(a) is cut out. Next, as shown in FIG. 4(a) and FIG. 4(b), grooves 3d to 3f are formed on the principal surface 30a of the wafer 30. In this case, in the case where an Si substrate is used, if the grooves 3d to 3f are formed by wet etching as an example, grooves 3d to 3f each having a V-shaped cross-section as shown in the figure can be formed. Furthermore, if the grooves 3d to 3f are formed by dry etching, the grooves 3d to 3f each having a rectangular cross-section can be formed.

Figure 5:
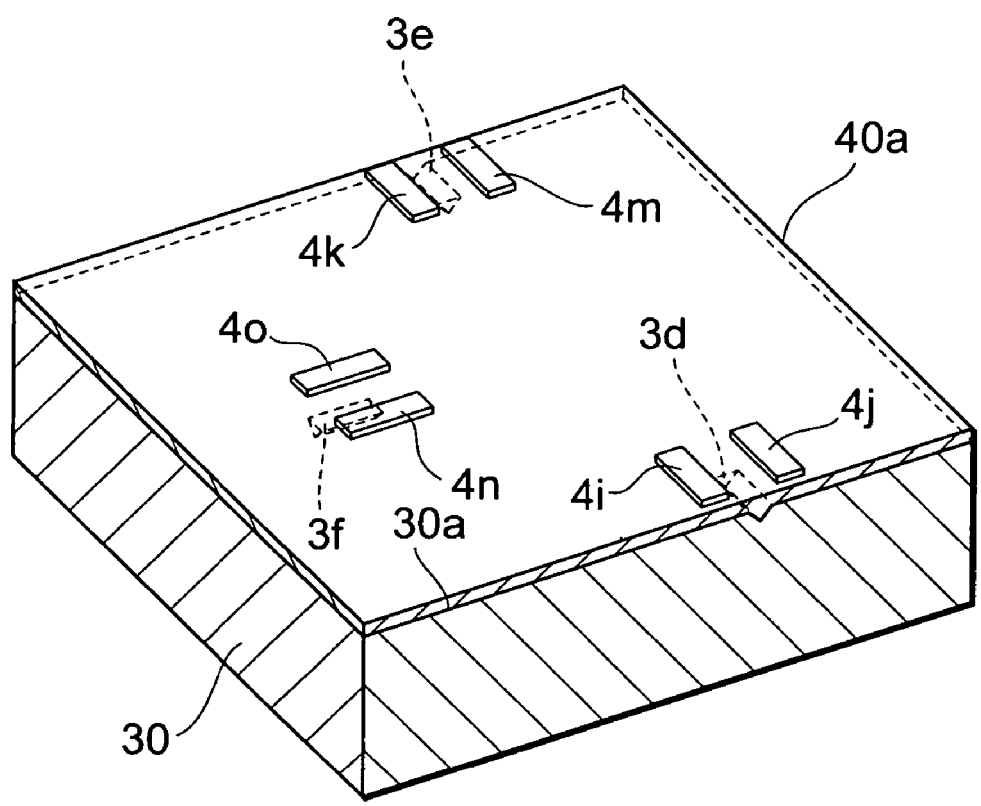
FIG. 5 is a diagram showing the manufacturing process of the optical waveguide substrate according to the first embodiment.

Subsequently, as shown in FIG. 5, a lower clad layer 40a is formed on the principal surface 30a of the wafer 30. The lower clad layer 40a is a layer constituting a part of the clad portion 4h shown in FIG. 1 and FIG. 2. At this time, when the lower clad layer 40a is formed of a polymer such as a polyimide or the like, the lower clad layer 40a may be formed on the principal surface 30a by coating (preferably, spin coating). Thereafter, the films 4i to 4o are formed on the lower clad layer 40a. Specifically, a metal film is formed on the lower clad layer 40a, and the metal film is etched (preferably, dry-etched) by using a mask having the pattern corresponding to the planar shapes of the films 4i to 4o to thereby form the films 4i to 4o.

Figure 6:
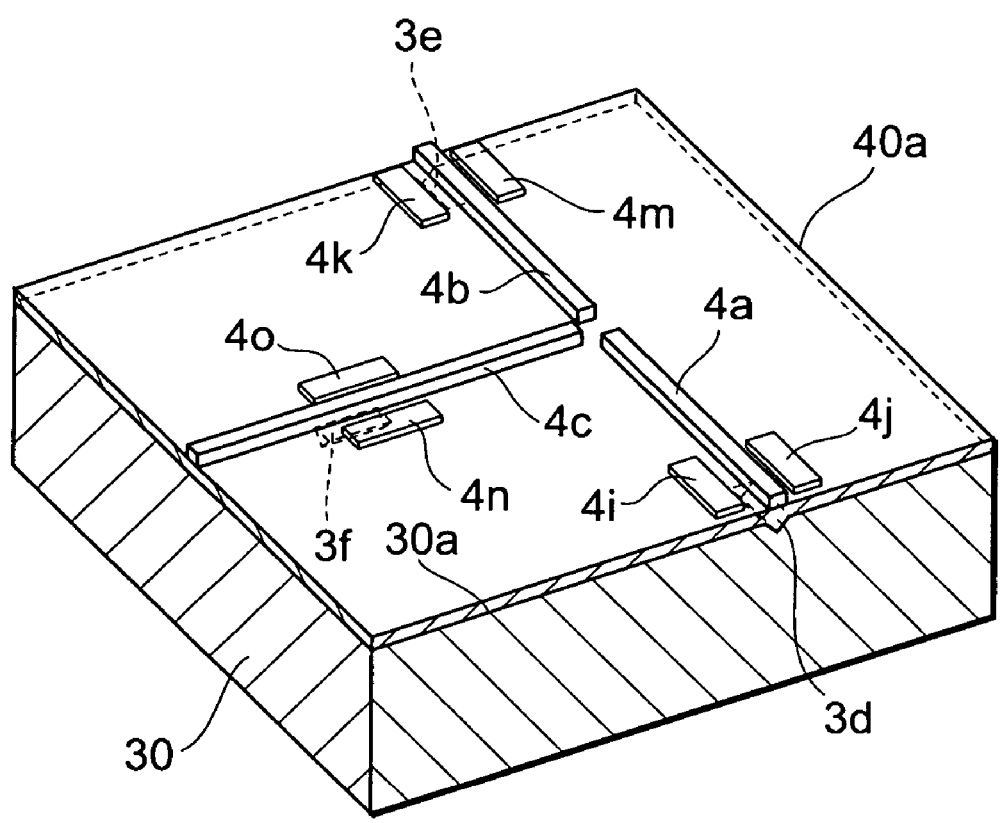
FIG. 6 is a diagram showing the manufacturing process of the optical waveguide substrate according to the first embodiment.
Figure 7:
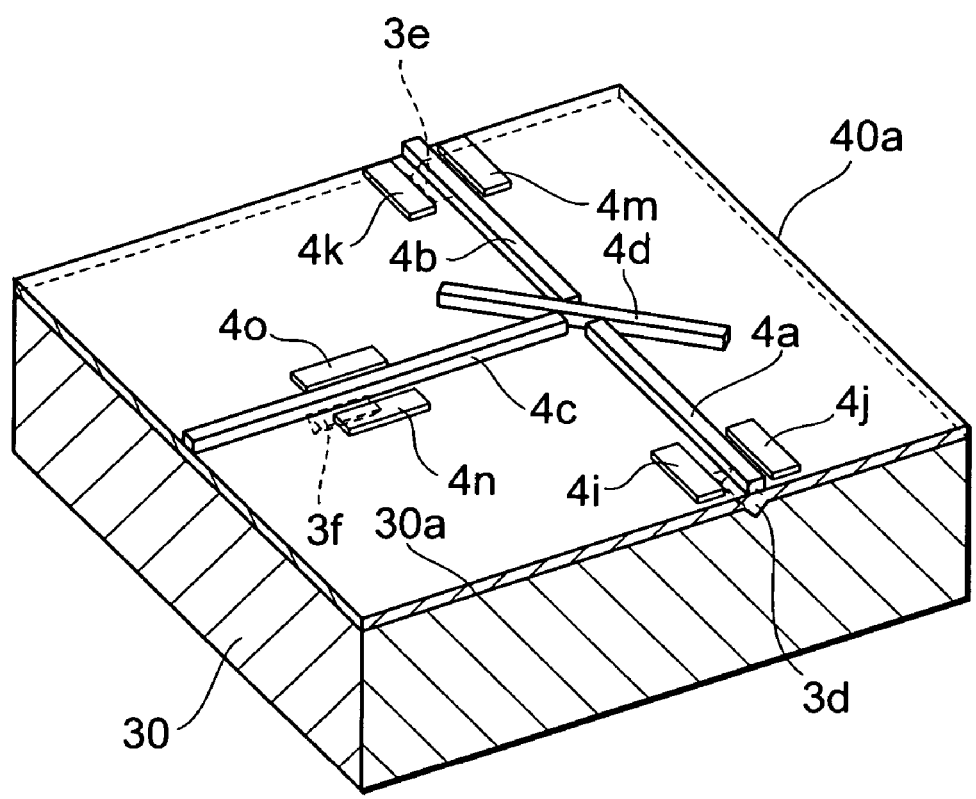
FIG. 7 is a diagram showing the manufacturing process of the optical waveguide substrate according to the first embodiment.
Figure 8:
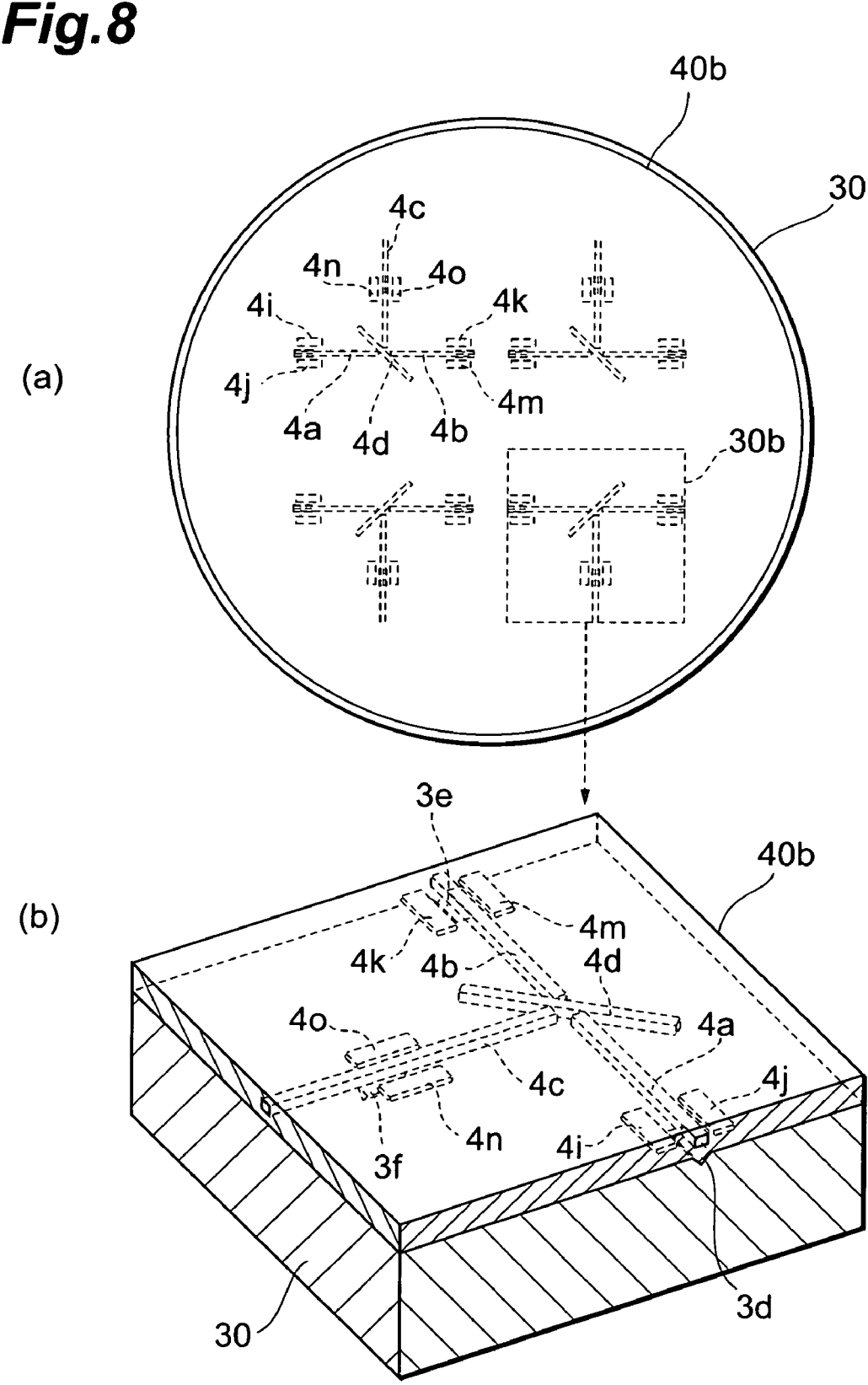
FIG. 8(a) and FIG. 8(b) are diagrams showing the manufacturing process of the optical waveguide substrate according to the first embodiment.

Subsequently, as shown in FIG. 6, the core portions 4a to 4c are formed on the lower clad layer 40a. Specifically, a core layer formed of the material of the core portions 4a to 4c is coated and formed on the lower clad layer 40a, and a mask having the pattern corresponding to the planar shapes of the core portions 4a to 4c (core pattern) is formed on the core layer. Then, the core layer is etched via the mask to form the core portions 4a to 4c. At this time, the core portions 4a to 4c are formed of material having a higher refractive index than the lower clad layer 40a. Thereafter, as shown in FIG. 7, the wavelength filter 4d is mounted on the lower clad layer 40a.

Subsequently, as shown in FIG. 8(a) and FIG. 8(b), the same clad material as the lower clad layer 40a is coated and formed so as to cover all the lower clad layer 40a, the core portion 4a to 4c and the wavelength filter 4d. Thereby, the clad layer 40b containing the core portions 4a to 4c and the wavelength filter 4d therein is formed.

Figure 9:
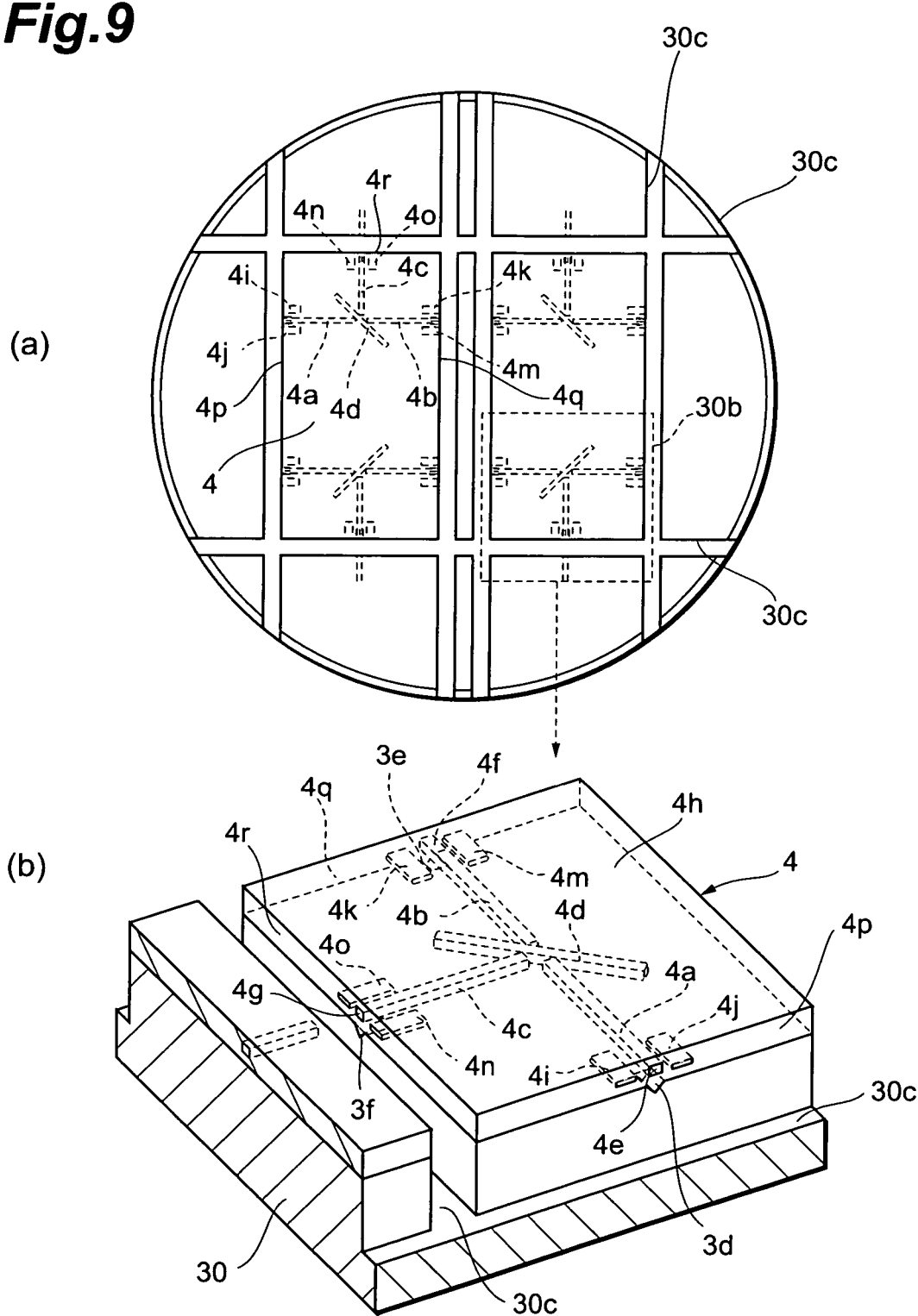
FIG. 9(a) and FIG. 9(b) are diagrams showing the manufacturing process of the optical waveguide substrate according to the first embodiment.

Subsequently, as shown in FIG. 9(a) and FIG. 9(b), grooves 30c each having a rectangular section is formed on the principal surface 30a of the wafer 30. At this time, the grooves 30c may be formed by carrying out dicing (half cutting) of the wafer 30 until some midpoint of the thickness of the wafer 30 along at least a part of a cutting-scheduled line in the next step. In the example of FIG. 9, the grooves 30c are formed along the surfaces on which the end faces 4e to 4g of the core portions 4a to 4c will be formed. The clad layer 40b is cut by the grooves 30c, the optical waveguide layer 4 having the side surfaces 4p to 4r are formed, and also the end faces 4e to 4g of the core portions 4a to 4c are formed. Furthermore, the grooves 3d to 3f formed on the principal surface 30a of the wafer 30 and the films 4i to 4o formed inside the optical waveguide layer 4 are exposed at the side surfaces 4p to 4r.

Subsequently, as shown in FIG. 10(a) and FIG. 10(b), the wafer 30 is cut in the form of a chip along the cutting lines $A_1$ by dicing or the like. At this time, when the grooves 30c are formed along the cutting lines $A_1$, the wafer 30 is cut along the center lines of the grooves 30c. FIG. 10(b) is a perspective view showing a chip after cutting. As shown in FIG. 10(b), the substrate 3 having the side surface 3b and the step portion 3c is formed in this cutting step.

Furthermore, as shown in FIG. 11(a) and FIG. 11(b), a wafer 50 different from the wafer 30 is prepared, and grooves 50c each having a rectangular section are formed on the principal surface 50a of the wafer 50. At this time, the grooves 50c are formed so as to be symmetrical with the grooves 30c shown in FIG. 9. The wafer 50 is cut in the form of a chip along the cutting lines $A_2$ by dicing or the like. At this time, when the grooves 50c are formed along the cutting lines $A_2$, the wafer 50 is cut along the center lines of the grooves 50c. FIG. 11(b) is a perspective view showing the chip after cutting. As shown in FIG. 11(b), the substrate 5 having the principal surface 5a, the side surface 5b and the step portion 5c is formed in the cutting step. The step of forming the substrate 5 may be carried out before the steps of forming the substrate 3 and the optical waveguide layer 4 described above or in parallel with these steps.

Figure 12:
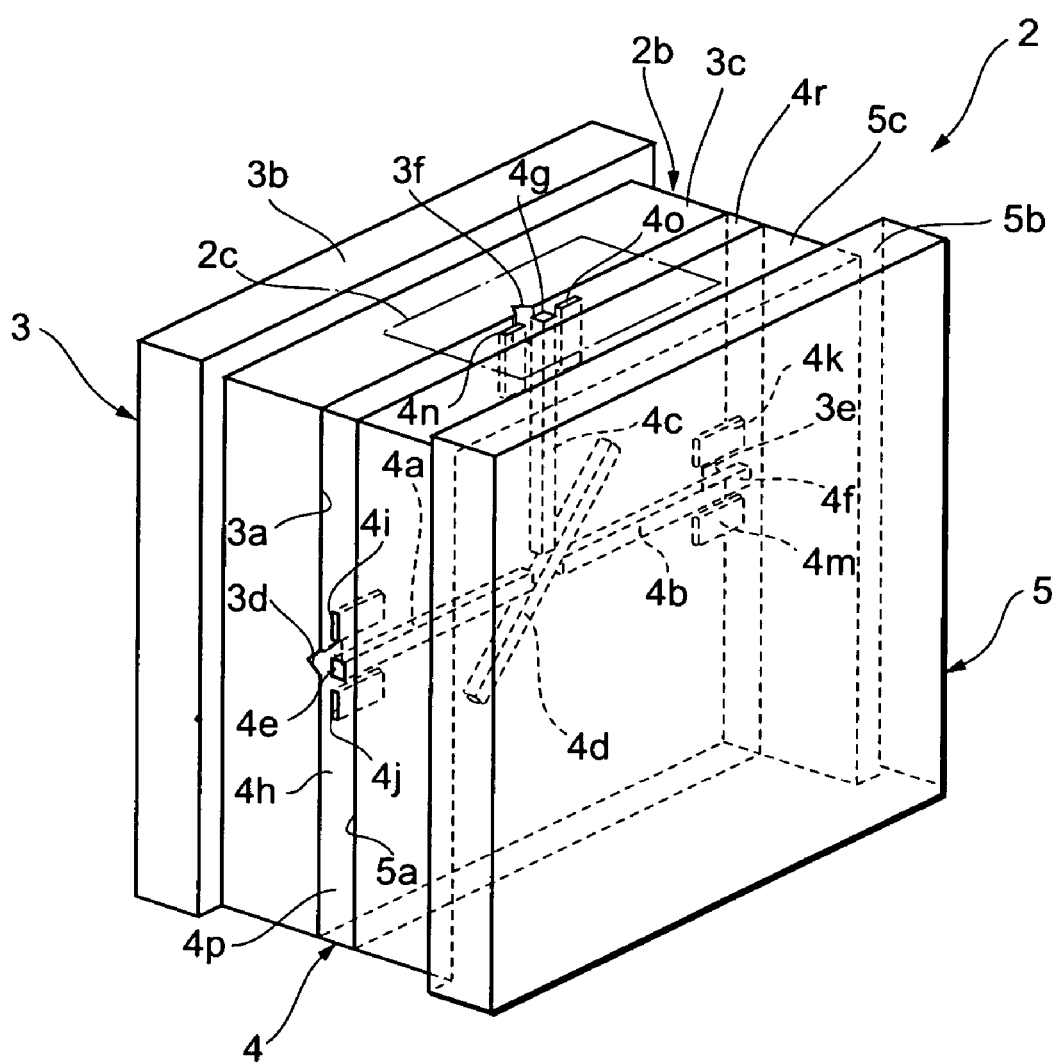
FIG. 12 is a diagram showing the manufacturing process of the optical waveguide substrate according to the first embodiment.

Subsequently, as shown in FIG. 12, the chip including the substrate 3 and the optical waveguide layer 4 is affixed to the substrate 5, thereby completing the optical waveguide substrate 2. At this time, the principal surface 3a of the substrate 3 and the principal surface 5a of the substrate 5 are facing each other so that the side surface 3b and the side surface 5b are aligned with each other, and the surface of the optical waveguide layer 4 on the substrate 3 and the principal surface 5a of the substrate 5 are affixed to each other. At this time, the optical waveguide layer 4 and the substrate 5 may be affixed to each other via an adhesive agent such as resin or the like, whereby the optical waveguide substrate 2 of this embodiment is completed. When the optical device 1 of this embodiment is manufactured, the photodetecting element 6 is mounted on the mount area 2c of the optical waveguide substrate 2. At this time, the groove 3f indicating the position of the end face 4g of the core portion 4c and the films 4n and 4o are formed on the side surface 2a of the optical waveguide substrate 2. Therefore, the photodetection area 6a of the photodetecting element 6 (see FIG. 1 and FIG. 2) can be easily positioned on the end face 4g.

Figure 11:
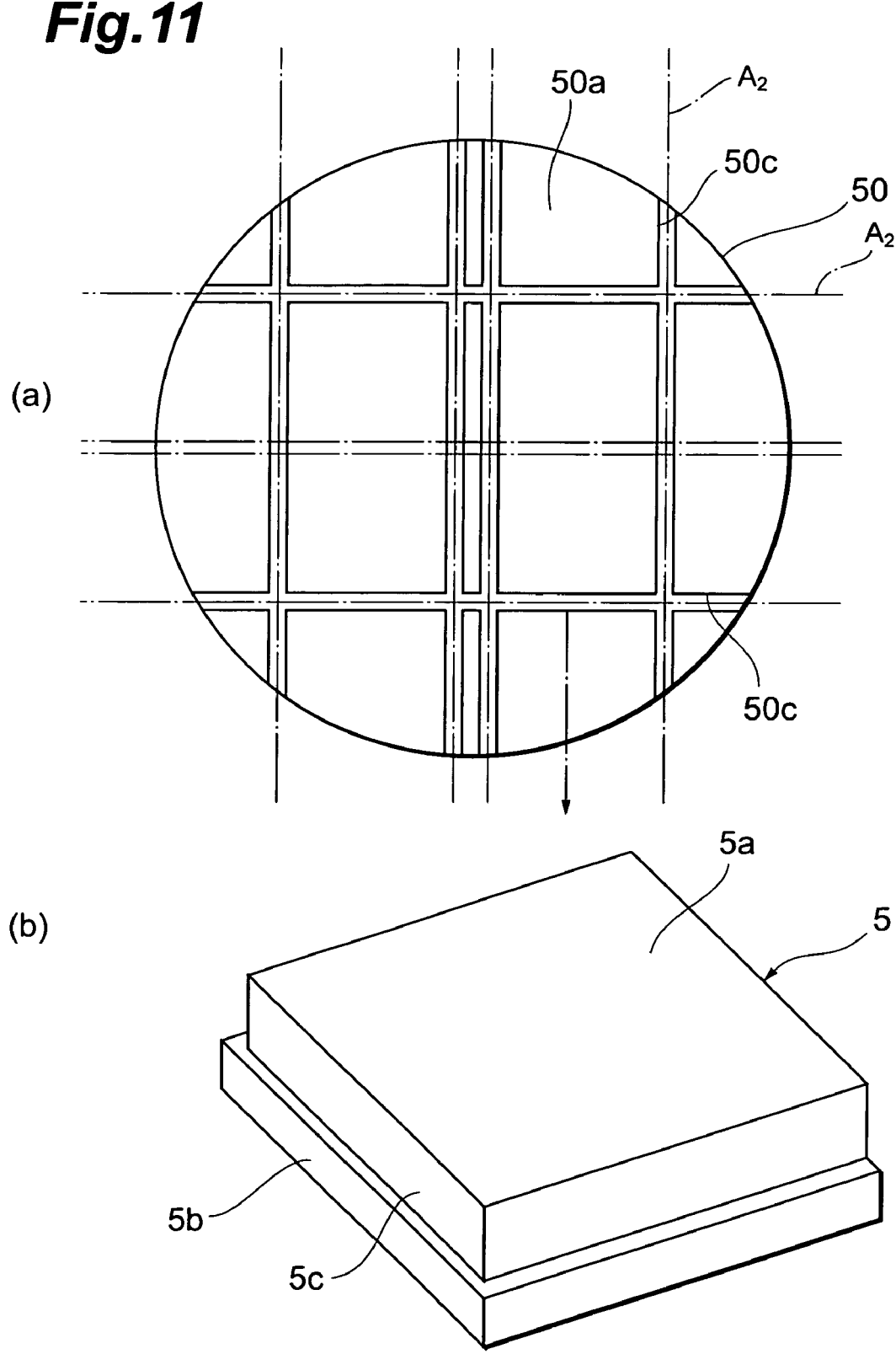
FIG. 11(a) and FIG. 11(b) are diagrams showing the manufacturing process of the optical waveguide substrate according to the first embodiment.

The recess portion (for example, 2b) on the side surface of the optical waveguide substrate 2 is implemented by forming the grooves 30c and 50c shown in FIG. 9 and FIG. 11. Accordingly, by forming the grooves 30c and 50c along any cutting lines $A_1$ and $A_2$ of the cutting lines $A_1$ and $A_2$ of the wafers 30 and 50, a recess portion can be formed on any side surface of the optical waveguide substrate 2.

Furthermore, in the above-described manufacturing method, after the wafers 30 and 50 are individually cut, the chip-type substrates 3 and 5 are affixed to each other to form the optical waveguide substrate 2. In another manufacturing method, after the grooves 30c and 50c are formed on the wafers 30 and 50 respectively, the wafers 30 and 50 may be affixed to each other before the wafers are cut in the form of a chip, and then the wafers 30 and 50 may be collectively cut out, thereby forming the optical waveguide substrate 2. In this case, the wafers 30 and 50 are affixed to each other so that the grooves 30c and 50c face each other, so that the grooves 30c and 50c are concealed after the affixing. Accordingly, marks indicating the cutting lines $A_1$ and $A_2$ are provided to the back surfaces of the wafers 30 and 50 before the wafers 30 and 50 are affixed to each other, and the wafers 30 and 50 are cut out in conformity with these marks after the wafers 30 and 50 are affixed to each other. Furthermore, when an adhesive agent such as resin or the like is used to affix the wafers 30 and 50 to each other, it is preferable to prevent the adhesive agent from intruding into the grooves 30c and 50c.

Furthermore, when light is waveguided in a single mode, the thickness of the lower clad layer 40a (FIG. 5) preferably ranges from not less than 10 μm to not more than 20 μm. Particularly, when the optical waveguide layer 4 is formed of fluorinated polyimide, the preferable thickness of the lower clad layer 40a is equal to 15 μm, for example. Furthermore, the thickness of the core portions 4a to 4c (FIG. 6) (the height in the layer thickness direction) preferably ranges from not less than 5 μm to not more than 10 μm. Particularly, when the optical waveguide layer 4 is formed of fluorinated polyimide, the preferable thickness of the core portions 4a to 4c is equal to 9 μm, for example. Furthermore, the thickness of the clad layer 40b (FIG. 8) preferably ranges from not less than 10 μm to not more than 30 μm from the top surfaces of the core portions 4a to 4c. Particularly, when the clad layer 40b is formed of fluorinated polyimide, the preferable thickness of the clad layer 40b is set to 20 μm from the top surfaces of the core portions 4a to 4c, for example.

Furthermore, when light is waveguided in a multi-mode, the thickness of the lower clad layer 40a, the core portions 4a to 4c and the clad layer 40b may be freely set in a broad range from 10 μm to several hundreds μm, and it is determined in accordance with the application thereof.

Furthermore, the thickness of the wavelength filter 4d in the direction parallel to the principal surface 3a preferably ranges from about 30 μm to about 100 μm when the wavelength filter 4d is formed of a polyimide, for example. However, in order to suppress the loss of light passing through the wavelength filter 4d, it is better that the thickness of the wavelength filter 4d is smaller (for example, 30 cm to 40 μm). Furthermore, it is necessary that the wavelength filter 4d is covered by the clad layer 40b, and thus it is preferable that the height of the wavelength filter 4d (that is, the width of the wavelength filter 4d in the normal direction of the principal surface 3a) ranges from about 30 μm to about 50 μm, for example. Furthermore, the width of the wavelength filter 4d in the direction parallel to the principal surface 3a can be appropriately determined in accordance with the mount stability and the breadth of the mount space of the wavelength filter 4d, and for example, the range from about 200 µm to about 400 µm is proper.

The effect of the optical device 1 according to the above-described embodiment will be described. In the optical device 1 of this embodiment, the mount area 2c for mounting the photodetecting element 6 therein is provided to the side surface 2a of the optical waveguide substrate 2, and also the mount area 2c contains the end face 4g of the core portion 4c serving as the optical waveguide and parts of the side surfaces 3b and 5b of the substrates 3 and 5. With this construction, the space in which the photodetecting element 6 can be mounted can be secured on the side surface 2a of the optical waveguide substrate 2, and the photodetecting element 6 strides over the end face 4g of the core portion 4c, whereby the photodetecting element 6 and the end face 4g of the core portion 4c can be optically coupled to each other without a clad portion 4c. Therefore, according to the optical device 1 of this embodiment, light scattering that occurs in an optical waveguide coupler disclosed in Japanese Published Unexamined Patent Application No. 10-293219 and is caused by the clad portion or the like can be avoided, so that the optical coupling efficiency between the photodetecting area 6a of the photodetecting element 6 and the core portion 4c can be enhanced.

In the optical waveguide coupler disclosed in Japanese Published Unexamined Patent Application No. 10-293219, a wavelength filter is embedded in a dicing groove. However, since the dicing groove is linearly formed along one direction, all optical waveguides extending in directions crossing the formation direction of the dicing groove are cut out, so that the optical waveguides bypassing the wavelength filter are cut. On the other hand, in the optical device 1 of this embodiment, the core portion 4c and the photodetecting element 6 are optically coupled to each other on the side surface 4r of the optical waveguide layer 4, and thus for example, even when the end face 4e and the end face 4f are required to be directly optically coupled to each other while bypassing the wavelength filter 4d, such a bypassing core portion can be preferably formed in the optical waveguide layer 4.

Furthermore, according to this embodiment, the mount area 2c is preferably contained in the bottom surface of the recess portion 2b formed on the side surface 2a of the optical waveguide substrate 2. Accordingly, a resin layer for adhesion and matching of the refractive index can be easily formed by pouring resin into the recess portion 2b.

Still furthermore, it is preferable that the recess portion 2b of the optical waveguide substrate 2 is constructed to contain the step portions 3c and 5c formed along the edges of the principal surfaces 3a and 5a of the substrates 3 and 5 as in the case of this embodiment. The step portions 3c and 5c as described above can be easily formed by forming the grooves 30c and 50c each having the rectangular section along the cutting lines $A_1$ and $A_2$ in advance when the substrates 3 and 5 are cut out from the wafers 30 and 50 (see FIGS. 9 to 11). Therefore, according to the optical device 1 of this embodiment, the recess portion 2b containing the mount area 2c in the bottom surface thereof can be easily formed on the side surface 2a of the optical waveguide substrate 2.

Still furthermore, it is preferable that the first marks (grooves 3d to 3f) indicating the positions of the end faces 4e to 4g of the core portions 4a to 4c in the directions along the principal surfaces 3a and 5a of the substrates 3 and 5 are formed on the side surface 2a of the optical wave guide substrate 2 as in the case of this embodiment. In the optical waveguide layer 4, the core portions 4a to 4c and the clad portion 4h are formed of materials transparent to waveguided light in many cases. In such a case, even when the end faces 4e to 4g of the core portions 4a to 4c are exposed from the side surfaces 4p to 4r of the optical waveguide layer 4, it is difficult to visually recognize the end faces 4e to 4g. However, if the accurate positions of the end faces 4e to 4g cannot be grasped, some displacement might occur between the relative position between the end face 4g and the photodetecting element 6 or the relative position between the end faces 4e and 4f and the optical transmission medium. When the relative position precision between the end faces 4e to 4g and the photodetecting element 6 or the optical transmission medium is low, the optical coupling efficiency between each end face and the photodetecting element 6 or the optical transmission medium is reduced to a low level.

On the other hand, according to the optical device 1 of this embodiment, the first marks indicating the positions of the end faces 4e to 4g in the directions along the principal surfaces 3a and 5a are formed on the side surfaces (2a, etc.) of the optical waveguide substrate 2, whereby the positions of the end faces 4e to 4g in the directions along the edges of the principal surfaces 3a and 5a can be easily and accurately visually recognized. Therefore, the photodetecting element 6 or the optical transmission medium can be secured to the side surfaces (2a, etc.) of the optical waveguide substrate 2 with high positional precision. Therefore, according to the optical device 1 of this embodiment, the relative positional precision between the photodetecting element 6 or the optical transmission medium and the end faces 4e to 4g can be enhanced, so that the optical coupling efficiency between the photodetecting element 6 and the end faces 4g can be further enhanced, and the optical coupling efficiency between the optical transmission medium and the end faces 4e and 4f can be enhanced.

Still furthermore, it is preferable that the first marks indicating the positions of the end faces 4e to 4g have the grooves 3d to 3f formed on the principal surface 3a of the substrate 3 so as to reach to the side surfaces of the optical waveguide substrate 2 as in the case of this embodiment. Thereby, the first marks which can be easily formed and reliably visually recognized can be provided to the side surfaces (2a, etc.) of the optical waveguide substrate 2.

Still furthermore, it is preferable that the second marks indicating the positions of the end faces 4e to 4g in the layer thickness direction are provided on the side surfaces 4p to 4r of the optical waveguide layer 4 as in the case of this embodiment. Accordingly, the positions of the end faces 4e to 4g in the layer thickness direction of the optical waveguide layer 4 can be easily and accurately visually recognized, and thus the photodetecting element 6 or the optical transmission medium can be secured to the side surfaces (2a, etc.) of the optical waveguide substrate 2 with high positional precision. Therefore, according to the optical device 1 of this embodiment, the precision of the relative position between the photodetecting element 6 or the optical transmission medium and the end faces 4e to 4g can be enhanced, so that the optical coupling efficiency between the photodetecting element 6 and the end face 4g can be further enhanced, and also the optical coupling efficiency between the optical transmission medium and the end faces 4e and 4f can be enhanced.

Still furthermore, it is preferable that the second marks indicating the positions of the end faces 4e to 4g are the films 4i to 4o that contain materials different from the clad portion 4h and embedded in the clad portion 4h so as to be exposed from the side surfaces 4p to 4r of the clad portion 4h.

Accordingly, the second marks which can be reliably visually recognized can be formed on the side surfaces 4p to 4r of the optical waveguide layer 4.

Second Embodiment

FIG. 13(a) is a perspective view showing the construction of a second embodiment of the optical device according to the present invention. FIG. 13(b) is a side view of the optical device 11 shown in FIG. 13(a) when it is viewed along the core portions 4a and 4b provided to the optical device 11. The difference in construction between the optical device 11 of this embodiment and the optical device 1 of the first embodiment resides in the presence or absence of the metal films 7a and 7b. That is, as shown in FIG. 13(a) and FIG. 13(b), the optical waveguide substrate 21 provided to the optical device 11 of this embodiment further has the metal films 7a and 7b in addition to the construction of the optical waveguide substrate 2 of the first embodiment. Since the construction other than the metal films 7a and 7b in the optical device 11 is similar to the construction of the optical device 1 of the first embodiment, detailed description thereof is omitted.

The metal films 7a and 7b are films formed of a metal such as Cr/Au, Ti/Pt/Au, Au/Sn or the like. The metal film 7a is formed on the side surface 3b of the substrate 3 (in this embodiment, on the step portion 3c). Furthermore, the metal film 7b is formed on the side surface 5b (on the step portion 5c) of the substrate 5 and between the principal surface 5a of the substrate 5 and the optical waveguide layer 4. Among these, the metal film 7a and a portion which is a part of the metal film 7b and formed on the step portion 5c of the substrate 5 constitute a wiring pattern to be electrically connected to the photodetecting element 6. Furthermore, the portion located between the principal surface 5a of the substrate 5 of the metal film 7b and the optical waveguide layer 4 constitutes a layer (metal layer) for joining the substrate 5 and the optical waveguide layer 4.

That is, the metal film 7a extends in the direction along the edge of the principal surface 3a on the step portion 3c of the substrate 3, and a bump electrode 6b of the photodetecting element 6 is joined to the portion of the metal film 7a within the mount area 2c. Furthermore, the portion of the metal film 7a out of the mount area 2c is electrically connected to an external circuit of the optical device 11 via a bonding wire or the like (not shown). Furthermore, the portion of the metal film 7b which is provided on the step portion 5c of the substrate 5 extends in the direction along the edge of the principal surface 5a on the step portion 5c, and the portion thereof within the mount area 2c is joined to another bump electrode 6b of the photodetecting element 6. Furthermore, the portion of the metal film 7b out of the mount area 2c is electrically connected to an external circuit of the optical device 11 via a bonding wire or the like (not shown). A surface incident type photodiode is preferably used as the photodetecting element 6 of this embodiment.

Furthermore, the portion of the metal film 7b which is located between the principal surface 5a of the substrate 5 and the optical waveguide layer 4 is formed in the form of a layer between the principal surface 5a of the substrate 5 and the optical waveguide layer 4. This portion of the metal film 7b is used when the substrate 5 and the optical waveguide layer 4 are joined to each other in the manufacturing step of the optical waveguide substrate 21, and the metal film (for example, Cr/Au) formed on the optical waveguide layer 4 and the metal film (for example, Cr/Au) formed on the principal surface 5a of the substrate 5 are bonded by thermo conpression bonding to each other as described later.

Figure 14:
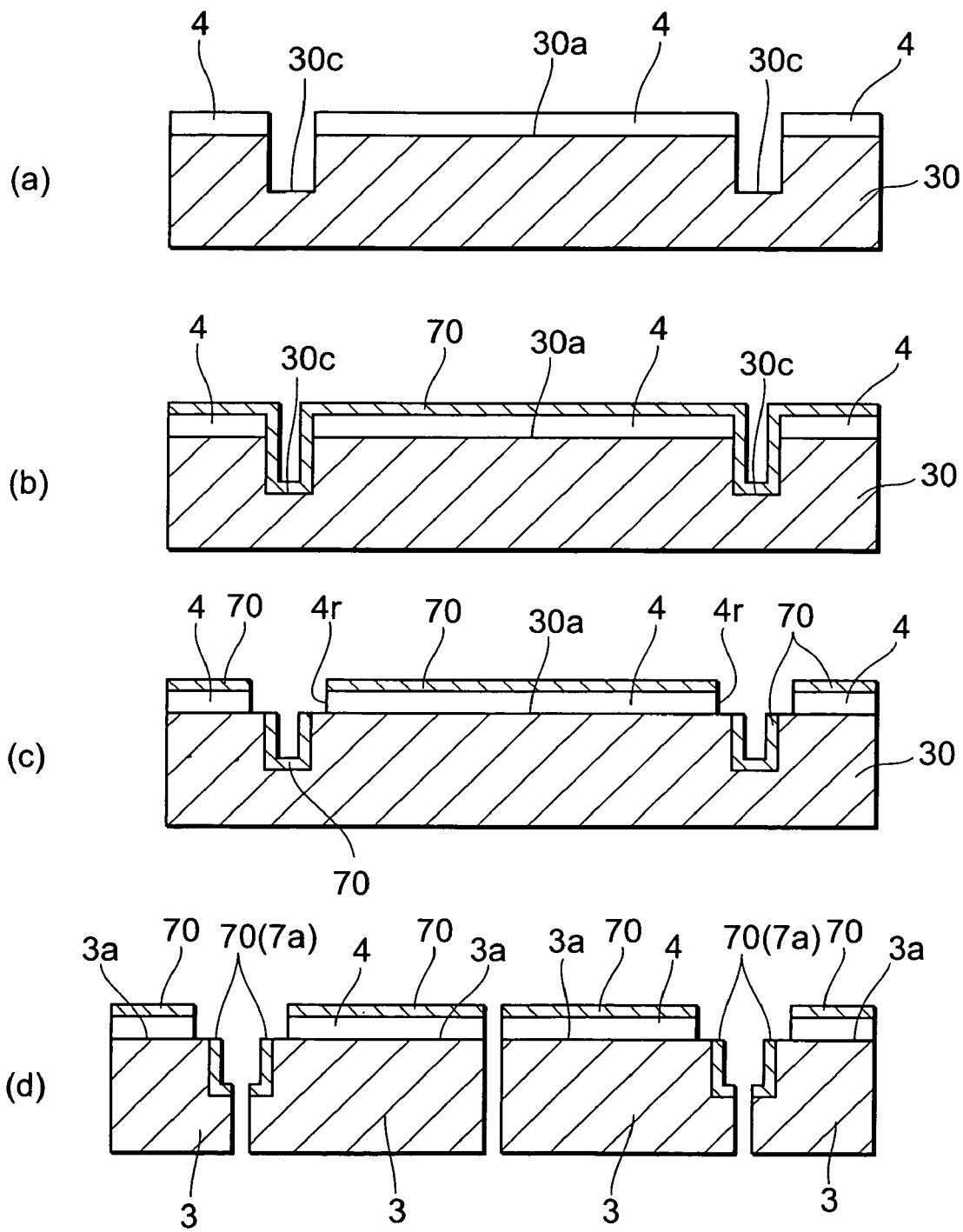
FIGS. 14(a) to (d) are side cross-sectional views showing the manufacturing process of the optical device according to the second embodiment in sequence.
Figure 15:
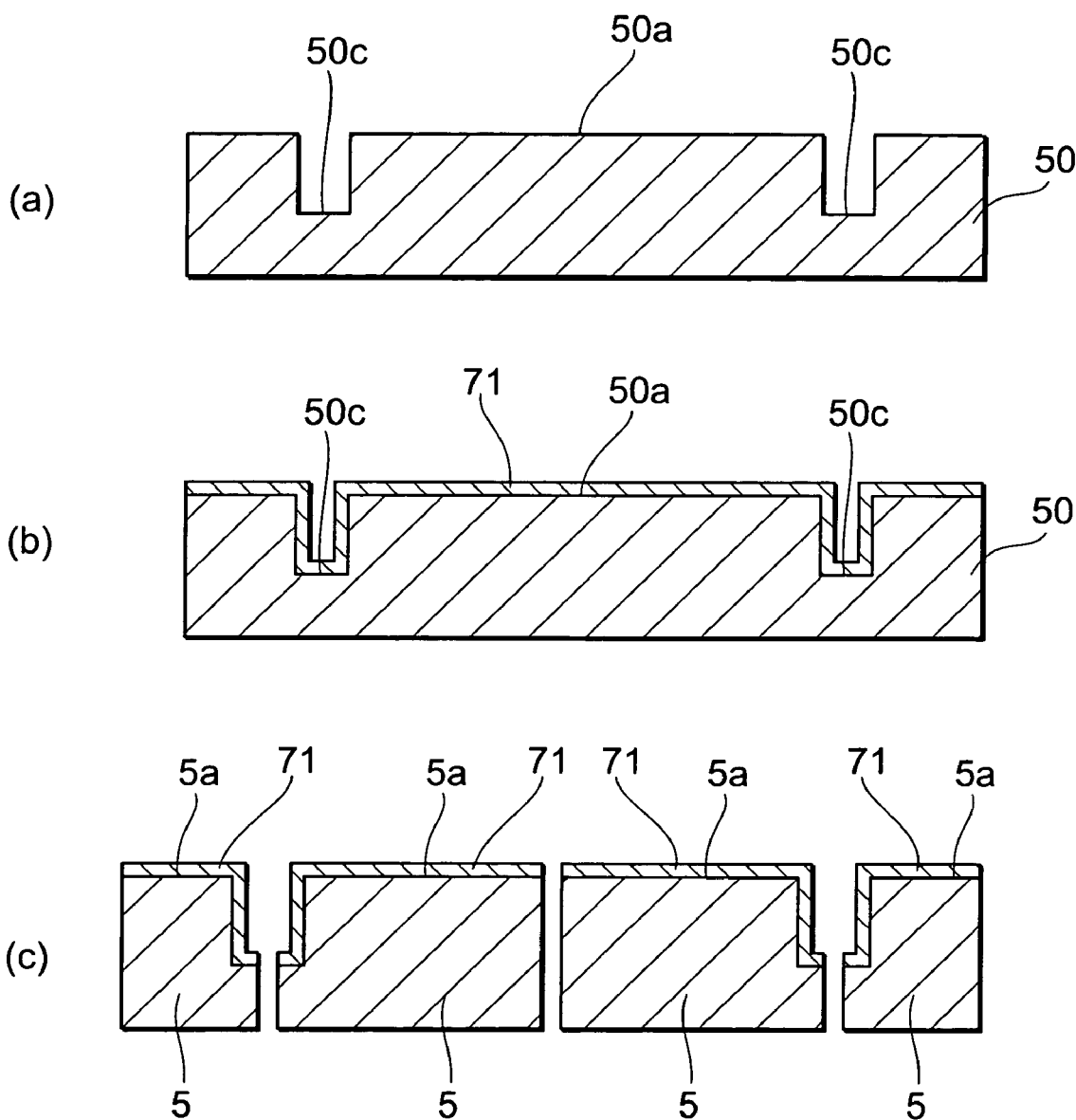
FIGS. 15(a) to (c) are side cross-sectional views showing the manufacturing process of the optical device of the second embodiment in sequence.

A method of manufacturing the optical device 11 according to this embodiment thus constructed will be described. FIGS. 14 to 16 are side cross-sectional views showing the manufacturing process of the optical device 11 in sequence.

First, as shown in FIG. 14(a), the optical waveguide layer 4 is formed on the principal surface 30a of the wafer 30, and the grooves 30c are formed in the wafer 30. The method of forming the optical waveguide layer 4 and the grooves 30c is the same as the first embodiment (FIGS. 4 to 9). Subsequently, as shown in FIG. 14(b), a metal film 70 of Cr/Au, Ti/Pt/Au, Au/Sn, for example, is formed on the optical waveguide layer 4 and on the bottom surfaces and side surfaces of the grooves 30c of the wafer 30 by deposition or sputtering. Only portions that are parts of the metal film 70 formed on the side surfaces of the grooves 30c and are formed on the side surfaces 4p to 4r of the optical waveguide layer 4 are thinly scraped by dicing half cut (FIG. 14(c)) so that the side surfaces 4p to 4r of the optical waveguide layer 4 are exposed from the metal film 70. Furthermore, these portions of the metal film 70 may be removed by etching or the like. Then, as shown in FIG. 14(d), the wafer 30 is cut along the cutting lines $A_1$ (see FIG. 10), thereby forming the substrate 3.

Still furthermore, as shown in FIG. 15(a), the grooves 50c are formed in the principal surface 50a of the wafer 50. The method of forming the groove 50c is the same as the first embodiment (see FIG. 11). Subsequently, as shown in FIG. 15(b), a metal film 71 of Cr/Au is deposited and formed on the main principal surface 50a of the wafer 50 and on the bottom surfaces and side surfaces of the grooves 50c. Then, as shown in FIG. 15(c), the wafer 50 is cut along the cutting lines $A_2$ (see FIG. 11) to form the substrate 5.

Subsequently, as shown in FIG. 16(a), the chip including the substrate 3 and the optical waveguide layer 4 and the substrate 5 are affixed to each other to complete the optical waveguide substrate 21. At this time, the principal surface 3a of the substrate 3 and the principal surface 5a of the substrate 5 are facing each other, and the metal film 70 on the optical waveguide layer 4 and the metal film 71 on the principal surface 5a are press-fitted to each other while heat is applied thereto. At this time, as shown in FIG. 16(b), the metal film 70 on the optical waveguide layer 4 and the metal film 71 on the principal surface 5 are integrated with each other, and the layered portion of the metal film 7b which is located between the optical waveguide layer 4 and the substrate 5 is formed. Accordingly, the optical waveguide substrate 21 of this embodiment is formed. Finally, the photodetecting element 6 is joined via the bump electrodes 6b of the photodetecting element 6 to the metal film 70 (that is, the metal film 7a) formed on the portion contained within the mount area 2c out of the step portion 3c of the substrate 3 and the metal film 71 formed on the portion contained within the mount area 2c out of the step portion 5c of the substrate 5 (that is, the portion on the step portion 5c out of the metal film 7b), whereby the photodetecting element 6 is mounted on the optical waveguide substrate 21. Furthermore, when Au/Sn is used for the metal layer (metal films 7a and 7b) of this embodiment, a semiconductor optical element can be joined without any bump electrode if there is provided an electrode surface only in the semiconductor optical element. Accordingly, the optical device 11 of this embodiment is completed as described above.

According to the optical device 11 of this embodiment, as in the case of the optical device 1 of the first embodiment, the space in which the photodetecting element 6 can be mounted can be secured on the side surface of the optical waveguide substrate 21, and also the end face of the core portion 4c of the optical waveguide layer 4 and the photodetecting element 6 can be preferably optically coupled to each other. Accordingly, the optical coupling efficiency between the photodetecting area 6a of the photodetecting element 6 and the core portion 4c can be enhanced.

Furthermore, as in the case of the optical device 11 of this embodiment, the optical waveguide substrate 21 may have a wiring pattern such as the metal films 7a and 7b to be electrically connected to the photodetecting element 6 on the side surfaces 3b and 5b of the substrates 3 and 5 in the mount area 2c (in this embodiment, on the step portions 3c and 5c). Accordingly, the electrical connecting means of the photodetecting element 6 can be secured on the side surface of the optical waveguide substrate 21, and the photodetecting element 6 can be directly mounted on the side surface of the optical waveguide substrate 21. In the optical device 11 of this embodiment, in order to enhance the optical coupling efficiency in the gap between the core portion 4c of the optical waveguide layer 4 and the photodetecting area 6a of the photodetecting element 6, a refractive index matching resin layer is preferably formed between the end face of the core portion 4c of the optical waveguide layer 4 and the photodetecting element 6.

Furthermore, as in the case of the optical device 11 of this embodiment, the optical waveguide substrate 21 may have the metal layer (metal layer 7b) for joining the substrate 5 and the optical waveguide layer 4 between the substrate 5 and the optical waveguide layer 4. That is, when the optical waveguide substrate 21 is manufactured, the metal films 70 and 71 are formed on the surface of the optical waveguide layer 4 and the principal surface 5a of the substrate 5 as described above, and the metal films 70 and 71 are bonded by thermo compression bonding to each other, whereby the optical waveguide layer 4 and the substrate 5 can be firmly joined to each other. Therefore, according to the optical device 11 of this embodiment, there can be implemented the optical waveguide substrate 21 in which the optical waveguide layer 4 and the substrate 5 are firmly joined to each other.

(First Modification)

Figure 17:
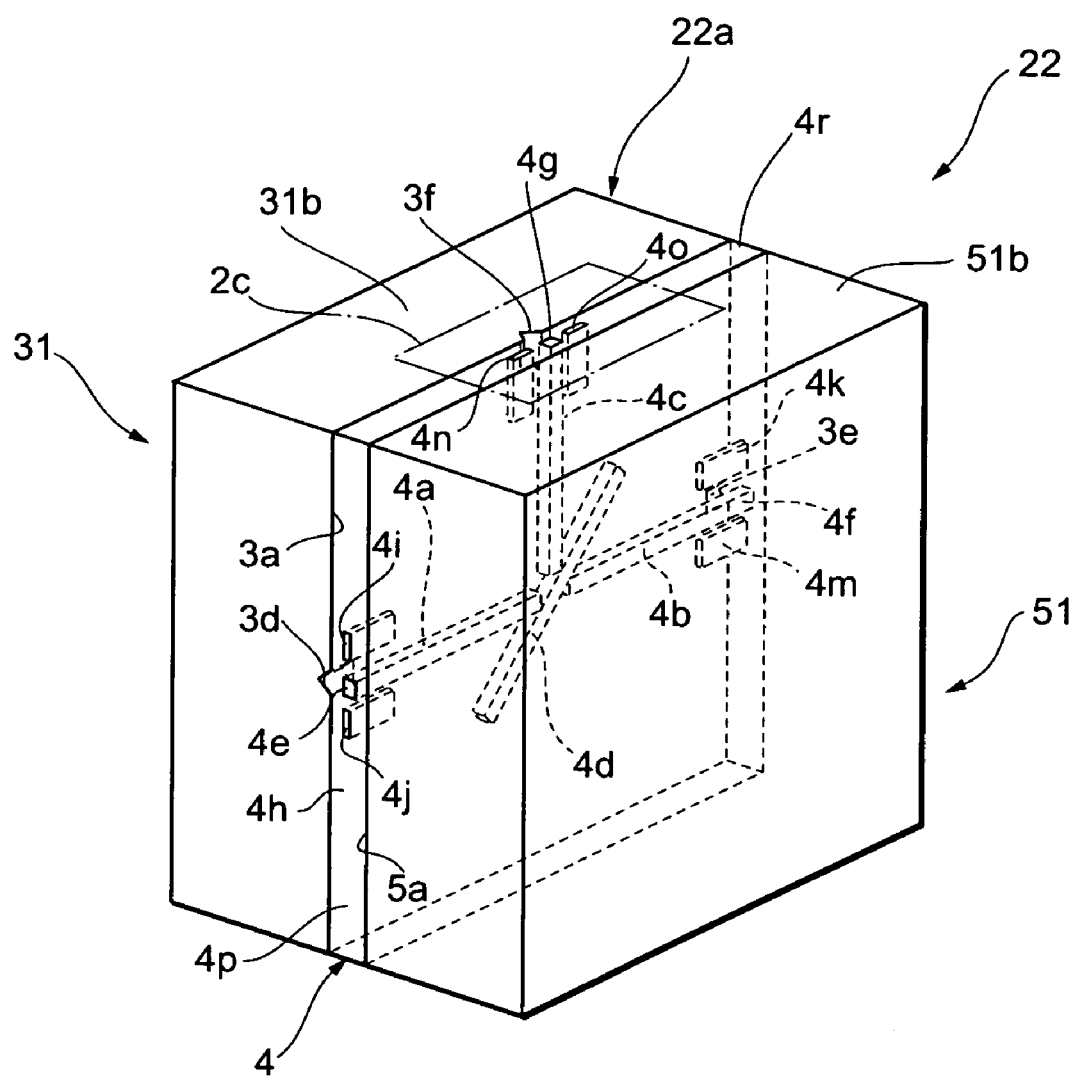
FIG. 17 is a perspective view showing the construction of an optical waveguide substrate as a first modification of the optical device according to the first embodiment.

FIG. 17 is a perspective view showing the construction of the optical waveguide substrate 22 as a first modification of the optical device 1 according to the first embodiment. The difference in construction between the optical waveguide substrate 2 of this modification and the optical waveguide substrate 2 of the first embodiment resides in the presence or absence of the recess portion 2b (see FIG. 1). That is, the optical waveguide substrate 22 of this modification is designed so that the side surface 22a thereof is flat. Specifically, the optical waveguide substrate 22 has substrates 31 and 51, and an optical waveguide layer 4 provided between the substrate 31 and the substrate 51. The side surface 31b of the substrate 31 and the side surface 51b of the substrate 51 are formed to be flat. The side surfaces 31b and 51b of the substrates 31 and 51 are preferably formed by cutting the wafers 30 and 50 without forming grooves 30c and 50c in the manufacturing steps shown in FIGS. 9 to 11.

On the side surface 22a of the optical waveguide substrate 22 of this modification, the mount area 2c for mounting the photodetecting element 6 thereon is set to an area containing the end face 4g of the core portion 4c, a part of the side surface 31b of the substrate 3 in the vicinity of the end face 4g and a part of the side surface 51b of the substrate 5 in the vicinity of the end face 4g.

The optical waveguide substrate provided to the optical device may be designed so that the side surface is flat as in the case of the optical waveguide substrate 22 of this modification. The optical device has the optical waveguide substrate 22 as described above, so that the same operation and effect as the optical device 1 of the first embodiment can be achieved.

(Second Modification)

FIG. 18(a) is a perspective view showing the construction of an optical waveguide substrate 23 as a second modification of the optical device 1 according to the first embodiment. FIG. 18(b) is a side view showing the construction of the optical device 12 of this modification. FIG. 18(b) is a side view showing the optical device 12 when it is viewed in a direction along the core portions 4a and 4b provided to the optical device 12.

The difference in construction between the optical device 12 of this modification and the optical device 1 of the first embodiment resides in the shape of the optical waveguide substrate 23. That is, the optical waveguide substrate 23 of this modification has a substrate 52 in place of the substrate 5 of the first embodiment. The step portion 52c of the substrate 52 is formed to be shallower than the step portion 3c of the substrate 3. Thereby, a step occurs between the side surface 3b of the substrate 3 and the side surface 52b of the substrate 52. This step also occurs between a part of the side surface 3b of the substrate 3 which is contained in the mount area 2c and a part of the side surface 52b of the substrate 52 which is contained in the mount area 2c. Accordingly, in the optical device 12, the photodetecting element 6 mounted on the side surface 23a of the optical waveguide substrate 23 is inclined as shown in FIG. 18(b).

As described above, according to the optical device 12 of this modification, the photodetecting element 6 is inclined with respect to the optical axis of light (to-be-detected light) emitted from the end face 4g of the core portion 4c by the step between the side surface 3b of the substrate 3 and the side surface 52b of the substrate 52. Accordingly, when the photodetecting element 6 is used as the semiconductor optical element as in the case of this modification, the photodetecting area 6a of the photodetecting element 6 can be preferably inclined with respect to the optical axis of the to-be-detected light, thereby Fresnel reflection in the photodetecting area 6a can be reduced. The Fresnel reflection means the reflection at the boundary end faces of the incident portion and emission portion of the optical waveguide. By bringing the boundary face with an angle, return light based on reflection can be reduced. In the case of this embodiment, the semiconductor optical element is mounted being inclined, whereby the Fresnel reflection can be reduced, and the angle thereof is preferably equal to about 8°. Since the gap occurs between the photodetecting area 6a of the photodetecting element 6 and the end face 4g of the core portion 4c by the step between the side surface 3b and the side surface 52b, the refractive index matching resin can be easily poured into the gap and thus the optical coupling efficiency between the photodetecting element 6 and the core portion 4c can be further enhanced.

(Third Modification)

Figure 19:
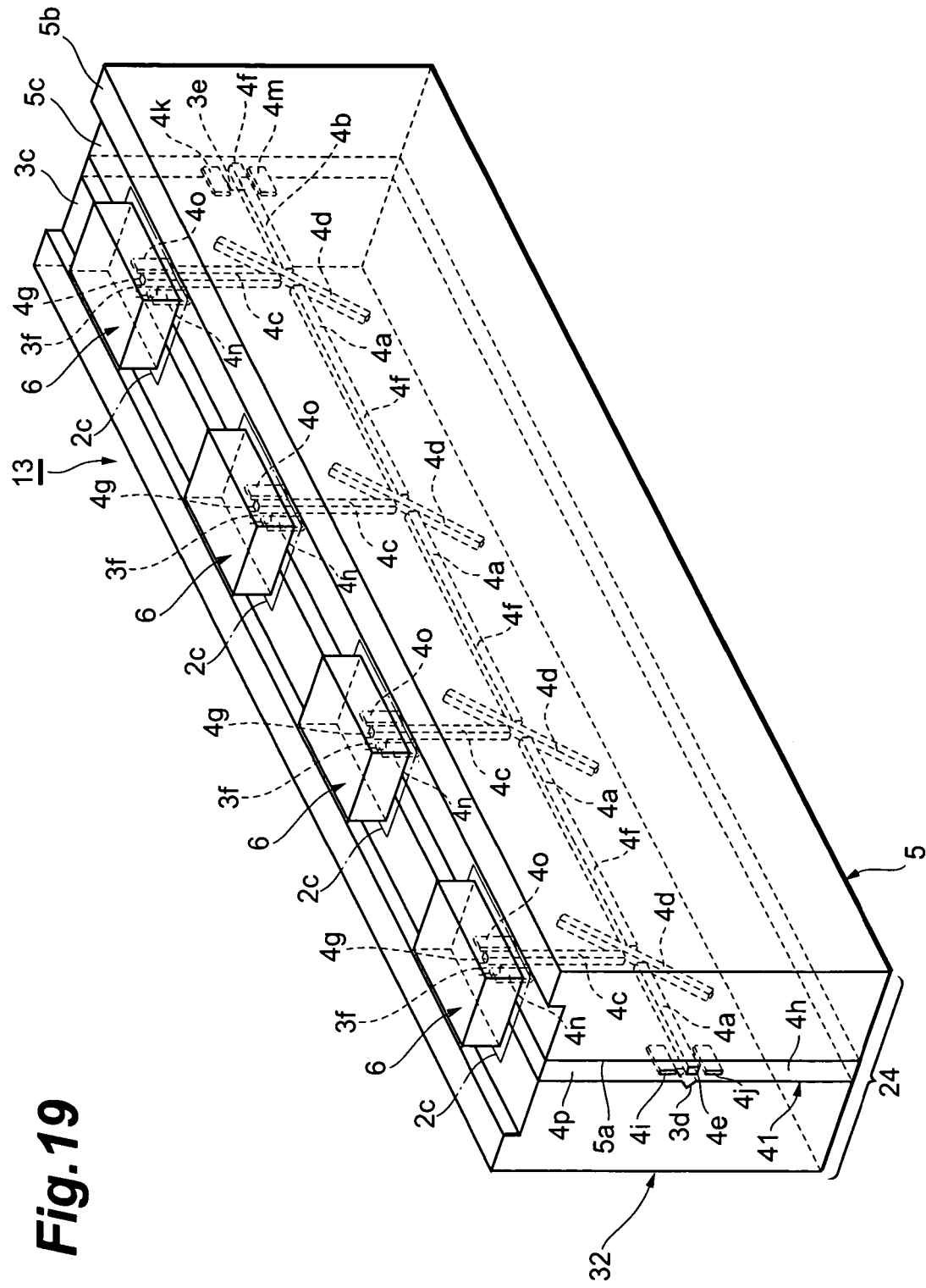
FIG. 19 is a perspective view showing the construction of a third modification of an optical device according to the first embodiment.

FIG. 19 is a perspective view showing the construction of an optical device 13 as a third modification of the optical device 1 according to the first embodiment. The main difference in construction between the optical device 13 of this modification and the optical device 1 of the first embodiment resides in the number of photodetecting elements 6. That is, the optical device 13 of this modification has a plurality of (for example, four) photodetecting elements 6.

The optical waveguide substrate 24 of this modification has an optical waveguide layer 41 in place of the optical waveguide layer 4 of the first embodiment. The optical waveguide layer 41 is constructed to contain the core portions 4c and the wavelength filters 4d whose numbers correspond to the number of the photodetecting elements 6.

Specifically, the optical waveguide substrate 24 has a substrate 32 (first substrate) and a substrate 5 (second substrate) and an optical waveguide layer 41 provided between the substrate 32 and the substrate 5. The construction of the substrate 5 is the same as the first embodiment except that the dimension thereof is longer by the amount corresponding to the incremental number of the photodetecting elements 6. The optical waveguide layer 41 contains plural core portions 4c and plural wavelength filters 4d whose numbers correspond to the number of the photodetecting elements 6, and the end face 4g of each of the plural core portions 4c is exposed at the side surface 4r of the optical waveguide layer 41. These end faces 4g are arranged on the side surface 4r of the optical waveguide layer 41 in juxtaposition with one another in the direction along the edges of the principal surface 3a and 5a. The optical waveguide layer 41 contains the films 4n and 4o exposed at the side surface 4r as marks indicating the position of each end face 4g in the layer thickness direction in the vicinity of each end face 4g. Furthermore, the optical waveguide layer 41 has core portions 4f. The core portions 4f are disposed between plural wavelength filters 4d, and the longitudinal directions thereof are set to the direction crossing the side surfaces 4p and 4q. Plural grooves 3f for indicating the positions of the respective end faces 4g are formed on the substrate 32 in accordance with the positions of the respective end faces 4g in the direction along the edge of the principal surface 3a.

Plural mount areas 2c whose number corresponds to the number of the photodetecting elements 6 are set on the side surface of the optical waveguide substrate 24. Each of the plural mount areas 2c is set to contain each end face 4g, a part of the side surface 3b of the substrate 32 (a part of the step portion 3c in this modification) and a part of the side surface 5b of the substrate 5 (a part of the step portion 5c). Each of the plural photodetecting elements 6 is disposed in each of the plural mount areas 2c.

According to the optical device 13 of this modification, the space in which the plural photodetecting elements 6 can be mounted can be secured on the side surface of the optical waveguide substrate 24, and each of the photodetecting elements 6 strides over the corresponding end face 4g, so that each photodetecting element 6 and each end face 4g of the core portion 4c can be optically coupled to each other without a clad portion 4h. Therefore, according to the optical device 13 of this modification, as in the case of the optical device 1 of the first embodiment, the light scattering caused by the clad portion or the like can be avoided, and the optical coupling efficiency between each photodetecting element 6 and each core portion 4c can be enhanced. Furthermore, the plural photodetecting elements 6 are disposed on the side surface of the optical waveguide substrate 24, so that many photodetecting elements 6 can be integrated in the optical device 13 and the optical device 13 can be miniaturized.

In the optical waveguide coupler disclosed in Japanese Published Unexamined Patent Application No. 10-293219, the grooves for mounting the wavelength filters are formed so as to cut the optical guide into pieces, and thus light is attenuated by the grooves. Accordingly, when light waveguided through the core is branched by plural wavelength filters, the light loss is increased and thus the number of branches (that is, the number of semiconductor optical elements to be mounted) is suppressed to a small value. On the other hand, in the optical de-vice 13 of this modification, each photodetecting element 6 and each core portion 4c are directly optically coupled to each other. Therefore, the light loss is small and the number of branches for light (the number of photodetecting elements 6) can be increased. When plural wavelength filters which are different in reflection wavelength are used, the wavelength components whose number corresponds to the number of the semiconductor optical elements can be branched.

Furthermore, in the optical waveguide coupler disclosed in Japanese Published Unexamined Patent Application No. 10-293219, the optical waveguide and the semiconductor optical element are optically coupled to each other via the clad, and thus when plural semiconductor optical elements are provided, light propagates through the clad, and thus there is a risk that cross-talk occurs between adjacent semiconductor optical elements. Furthermore, in order to avoid cross-talk, it is necessary that the plural semiconductor optical elements are disposed keeping a sufficient interval therebetween. On the other hand, in the optical device 13 of this modification, each photodetecting element 6 and each core portion 4c are directly optically coupled to each other, and thus the cross-talk between the adjacent photodetecting elements 6 can be reduced. Accordingly, plural photodetecting elements 6 can be arranged every short interval. Therefore, as compared with the optical waveguide coupler disclosed in Japanese Published Unexamined Patent Application No. 10-293219, the plural photodetecting elements 6 can be integrated with high density, or the optical device can be further miniaturized.

Figure 20:
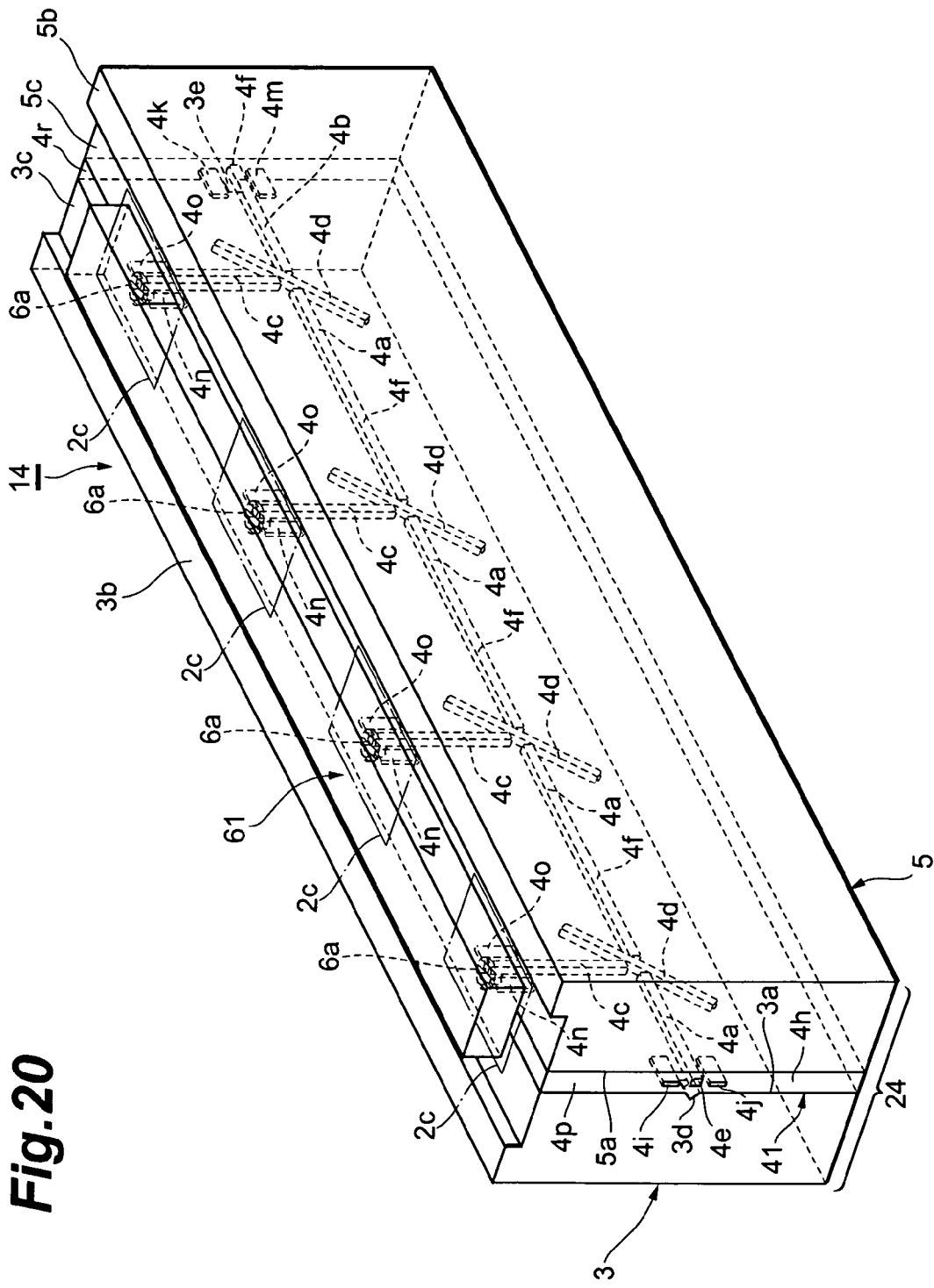
FIG. 20 is a perspective view showing the construction of an optical device as another mode of a third modification.

FIG. 20 is a perspective view showing the construction of an optical device 14 as another mode of this modification. The difference in construction between the optical device 14 and the optical device 13 shown in FIG. 19 resides in that a photodetecting element array 61 is provided in place of plural photodetecting elements 6. That is, the optical device 14 has the photodetecting element array 61 including plural integrated photodetecting elements on the side surface of the optical waveguide substrate 24. The photodetecting element array 61 is mounted over plural mount areas 2c on the side surface of the optical waveguide substrate 24, and the plural photodetecting areas 6a correspond to the plural mount areas 2c.

The above-described effect of this modification can also be preferably achieved even when the photodetecting element array 61 having the integrated plural photodetecting elements is used in place of plural photodetecting elements 6 as in the case of the optical device 14.

(Fourth Modification)

Figure 21:
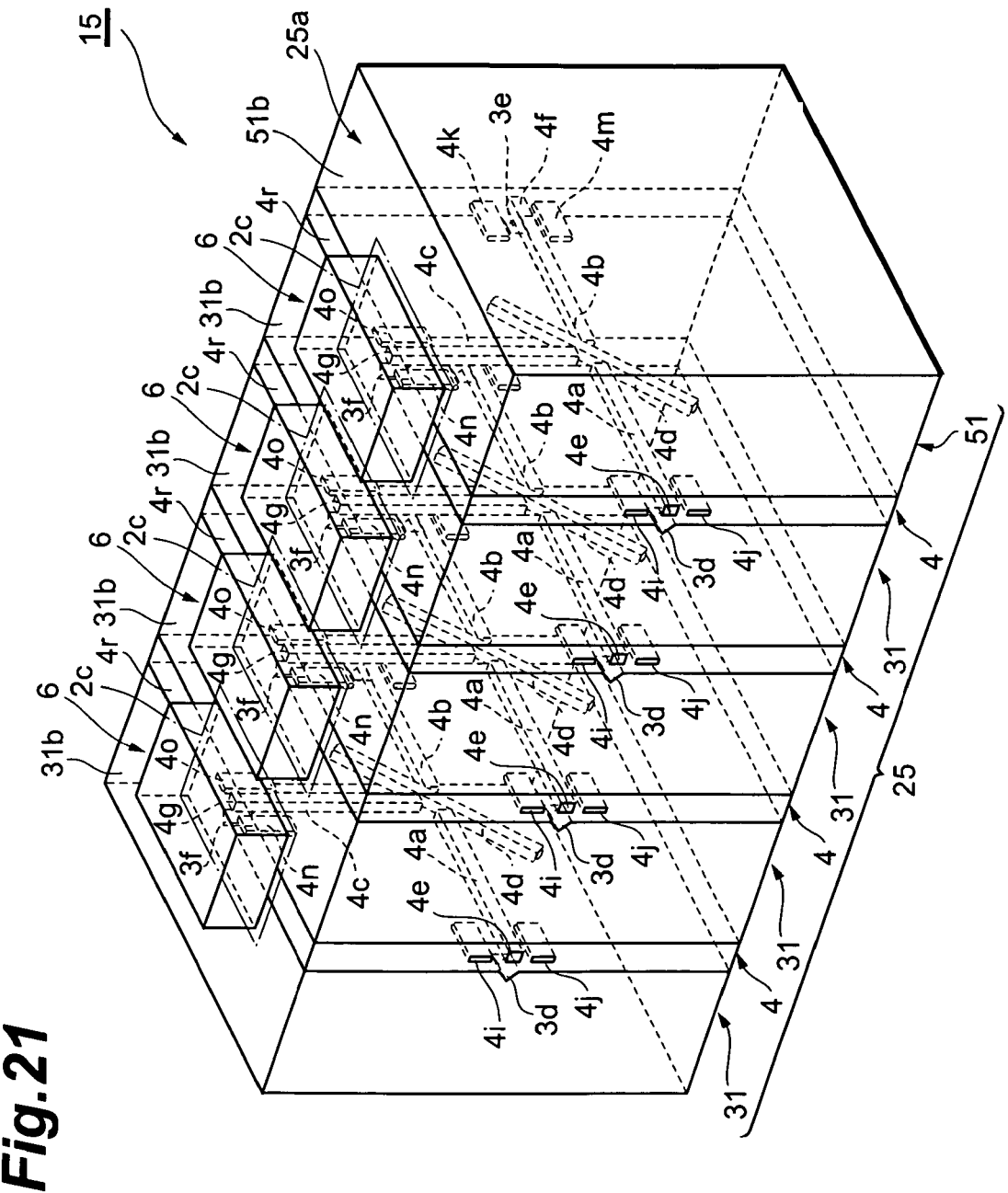
FIG. 21 is a perspective view showing the construction of a fourth modification of the optical device according to the first embodiment.

FIG. 21 is a perspective view showing the construction of the optical device 15 as a fourth modification of the optical device 1 according to the above-described first embodiment. The main difference in construction between the optical device 15 of this modification and the optical device 1 of the first embodiment resides in the shape of the substrates 31 and 51, the number of layers of the substrate 31 and the optical waveguide layer 4 and the number of photodetecting elements 6. That is, the optical waveguide substrate 25 of this modification has optical waveguide layers 4 of n layers (n represents an integer of 2 or more, and FIG. 21 shows a case where n is equal to 4 as an example) laminated in the layer thickness direction. Each of the optical waveguide layers 4 of n layers has the same construction as the optical waveguide layer 4 of the first embodiment. The optical waveguide substrate 25 has substrates 31 of n and the optical waveguide layers 4 of n layers which are alternately laminated in the layer thickness direction, and one substrate 51. Specifically, each of the optical waveguide layers 4 of n layers is formed on each of the n substrates 31, and n layers each of which has a unit of each substrate 31 and each optical waveguide layer 4 are laminated in the layer thickness direction and joined to each other. The substrate 51 is joined to the surface of the optical waveguide layer 4 located at the most end portion in the layer thickness direction. The substrates 31 and 51 of this modification are designed so that the side surfaces 31b and 51b thereof are flat as in the case of the substrates 31 and 51 of the first modification.

Mount areas 2c of n are set on the side surface 25a of the optical waveguide substrate 25. Each of the n mount areas 2c is set to contain the end face 4g of the core portion 4c of the corresponding optical waveguide layer 4 out of the optical waveguide layers 4 of n layers and parts of side surfaces 31b of the substrates 31 (and the side surfaces 51b of the substrates 51) disposed at both sides of the optical waveguide layer 4. Each of the photodetecting elements 6 of n is disposed in each of the mount areas 2c of n.

According to the optical device 15 of this modification, the space in which the photodetecting elements 6 of n can be mounted can be secured on the side surface of the optical waveguide substrate 25, and each of the photodetecting elements 6 of n strides over the end face 4g of the core portion 4c of the corresponding optical waveguide layer 4, whereby the end face 4g of the core portion 4c of each optical waveguide layer 4 and each photodetecting element 6 can be optically coupled to each other without a clad portion 4h. Therefore, according to the optical device 15 of this modification, as in the case of the optical device 1 of the first embodiment, light scattering caused by the clad portion, etc., can be avoided, and the optical coupling efficiency between the core portion 4c of each optical waveguide layer 4 and each photodetecting element 6 can be enhanced. Furthermore, the optical waveguide layers 4 of n layers are laminated in the layer thickness direction, whereby many optical waveguides (core portions 4a to 4c) are integrated in the optical device 15, and also the optical device 15 can be miniaturized.

(Fifth Modification)

Figure 22:
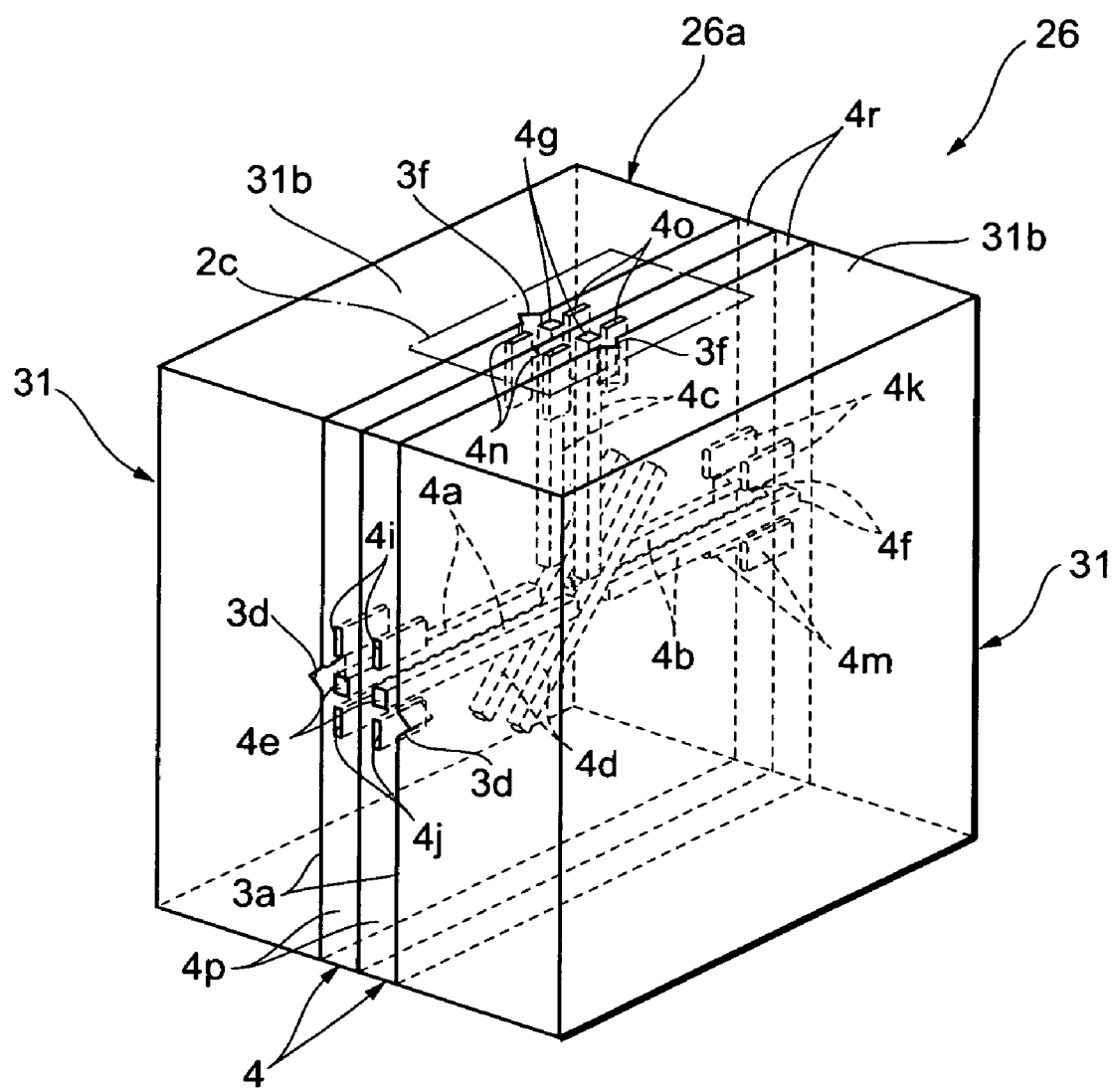
FIG. 22 is a perspective view showing the construction of an optical waveguide substrate as a fifth modification of the optical device according to the first embodiment.

FIG. 22 is a perspective view showing the construction of a optical waveguide substrate 26 as a fifth modification of the optical device 1 according to the first embodiment. The difference in construction between the optical waveguide substrate 26 of this modification and the optical waveguide substrate 2 of the first embodiment resides in the presence or absence of the recess portion 2b (see FIG. 1) and the number of layers of the optical waveguide layers 4 disposed between the two substrates. That is, the optical waveguide substrate 26 of this modification has two substrates 31 disposed so that the principal surfaces 3a thereof are facing each other, and the optical waveguide layers 4 of two layers are superposed between the two substrates 31. In this modification, one substrate 31 of the two substrates 31 corresponds to a first substrate of the present invention, and the other substrate 31 corresponds to a second substrate of the present invention. The construction of the optical waveguide layers 4 (the core portions 4a to 4c, the wavelength filter 4d, the clad portion 4h, and the films 4i to 4o) are the same as the construction of the optical waveguide layers 4 of the first embodiment.

The two substrates 31 have the same construction as the substrate 31 of the first modification (see FIG. 17). In this modification, the optical waveguide layers 4 are formed on the principal surfaces 3a of the two substrates 31, and the surfaces of the optical waveguide layers 4 are joined to each other, thereby constructing the optical waveguide substrate 26. Furthermore, the mount area 2c on the side surface 26a of the optical waveguide substrate 26 may collectively contain the end faces 4g of the core portions 4c of the optical waveguide layers 4 of 2 layers as shown in FIG. 22. Or, the mount areas 2c may be set individually to the end faces 4g.

As in the case of this modification, the optical waveguide substrate may have plural optical waveguide layers 4 between the two substrates 31. Even in the above construction, the same operation and effect as the optical device 1 of the first embodiment can be achieved.

(Sixth Modification)

Figure 23:
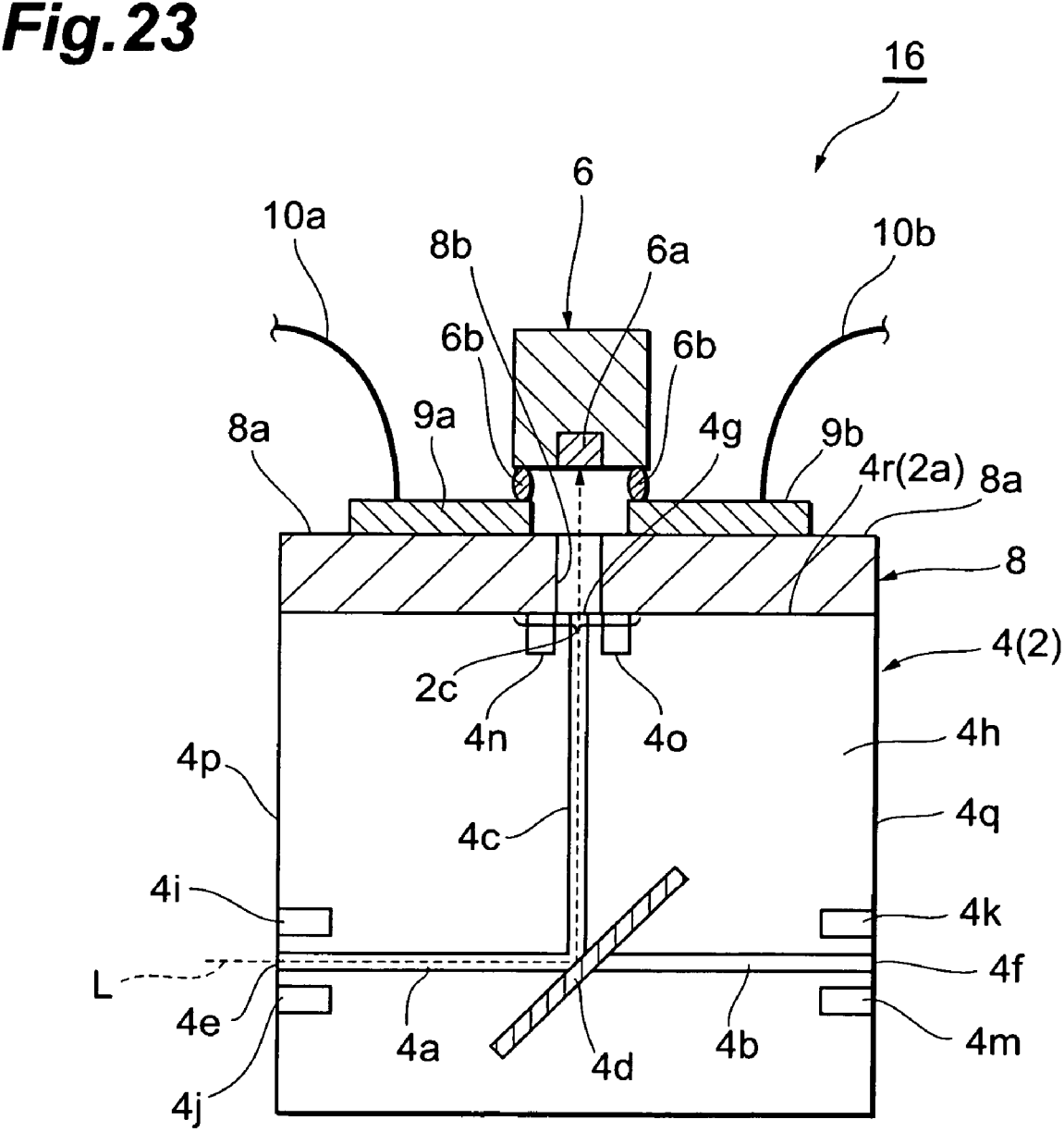
FIG. 23 is a side cross-sectional view showing the construction of a modification of an optical device according to the first embodiment.

FIG. 23 is a side cross-sectional view showing the construction of an optical device 16 as a sixth modification of the optical device 1 according to the first embodiment. The difference in construction between the optical device 16 of this modification and the optical device 1 of the first embodiment resides in the presence or absence of a wiring substrate 8. That is, the optical device 16 of this modification has a wiring substrate 8 having a wiring pattern (for example, 9a and 9b) electrically connected to the photodetecting element 6 between the side surface 2a of the optical waveguide substrate 2 and the photodetecting element 6. The construction of the optical waveguide substrate 2 in the optical device 16 of this modification is the same as the first embodiment.

The wiring substrate 8 is a plate-shaped member having the principal surface 8a. The wiring substrate 8 is mounted on the side surface 2a of the optical waveguide substrate 2 so that the back surface thereof and the side surface 4r of the optical waveguide layer 4 are facing each other. Furthermore, a light passing portion as an opening (through hole) 8b is formed at the position corresponding to the end face 4g of the core portion 4c in the wiring substrate 8, and to-be-detected light L passes through this opening 8b, whereby the photodetecting area 6a of the photodetecting element 6 and the end face 4g of the core portion 4c are optically coupled to each other.

Furthermore, metal wiring patterns 9a and 9b are provided on the principal surface 8a of the wiring substrate 8. The wiring patterns 9a and 9b are provided in an area containing the corresponding area above the mount area 2c in which the photodetecting element 6 is mounted in the principal surface 8a of the wiring substrate 8. The photodetecting element 6 is joined on the wiring patterns 9a and 9b via the bump electrodes 6b to thereby mount the photodetecting element 6. The wiring patterns 9a and 9b are electrically connected to an external circuit of the optical device 16 through wires 10 and 10b or the like.

According to the optical device 16 of this modification, the photodetecting element 6 can be preferably mounted on the side surface 2a of the optical waveguide substrate 2, and also the photodetecting element 6 and the end face 4g of the core portion 4c can be preferably optically coupled to each other via the opening 8b provided to the wiring substrate 8. Furthermore, after the photodetecting element 6 is mounted on the wiring substrate 8, the wiring substrate 8 is secured to the optical waveguide substrate 2. Accordingly, particularly when plural photodetecting elements 6 are used (see FIG. 19 and FIG. 21), the photodetecting elements 6 can be easily mounted. As the light passing portion provided to the wiring substrate 8, not only the opening 8b shown in this modification, but also various types for transmitting light (to-be-detected light) therethrough such as a lens, a transparent member or the like embedded in the wiring substrate 8, for example, may be applied.

(Seventh Modification)

FIGS. 24 to 29 are diagrams showing another manufacturing method of the optical waveguide layer 4 provided to the optical device 1 of the first embodiment as a seventh modification.

Figure 24:
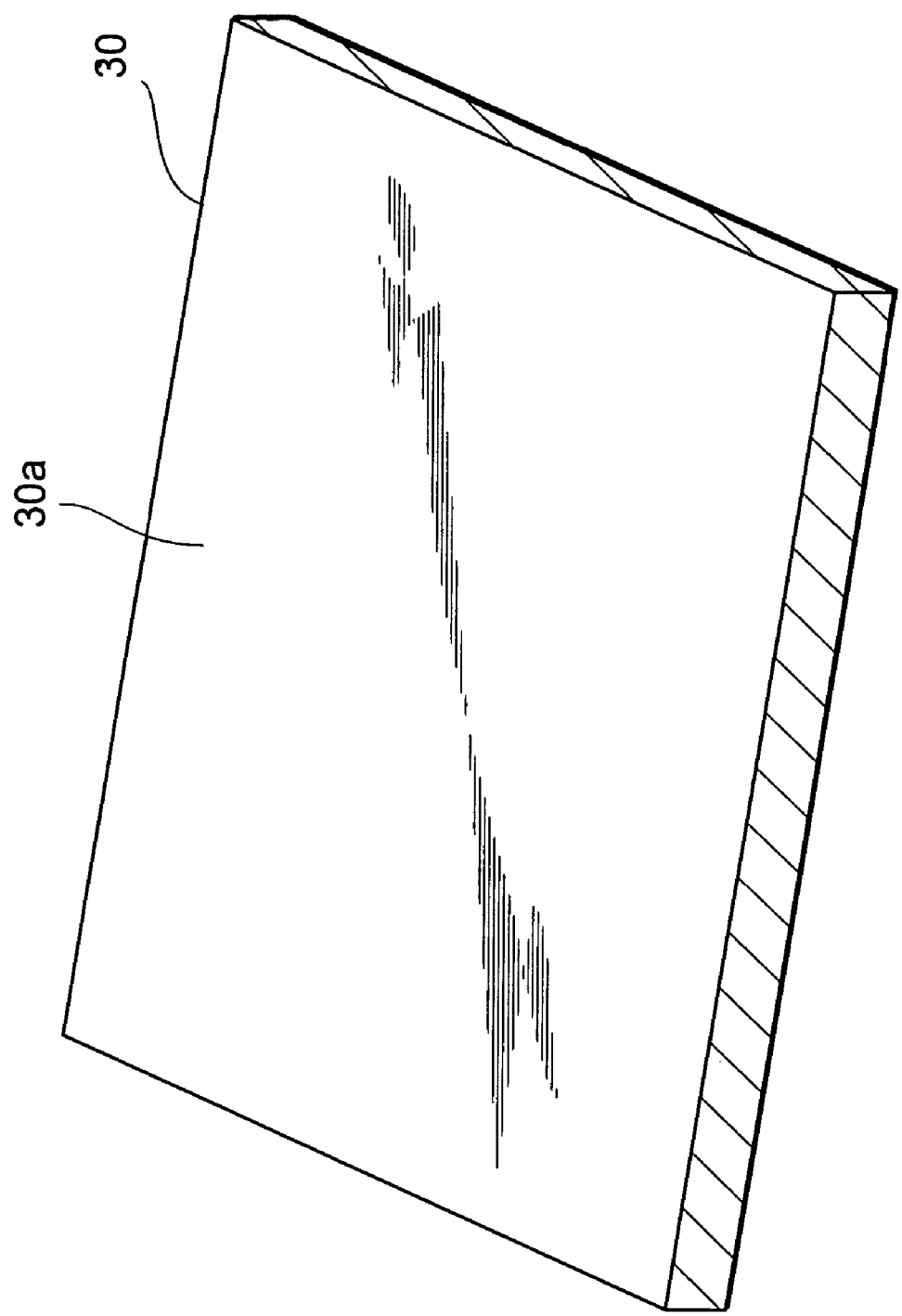
FIG. 24 is a diagram showing another manufacturing method of the optical waveguide layer as a seventh modification.
Figure 25:
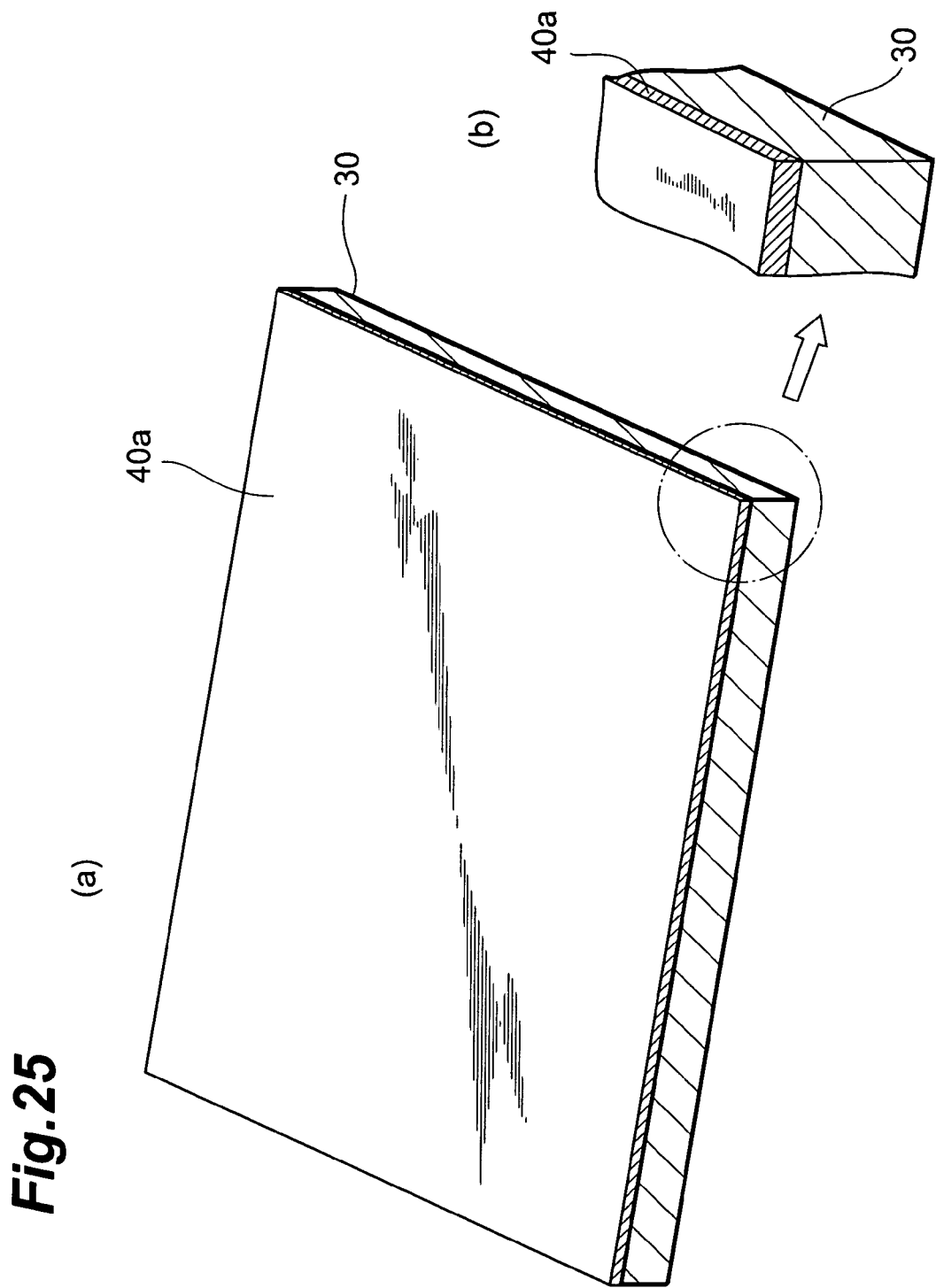
FIG. 25(a) and FIG. 25(b) are diagrams showing the other manufacturing method of the optical waveguide layer as the seventh modification.
Figure 26:
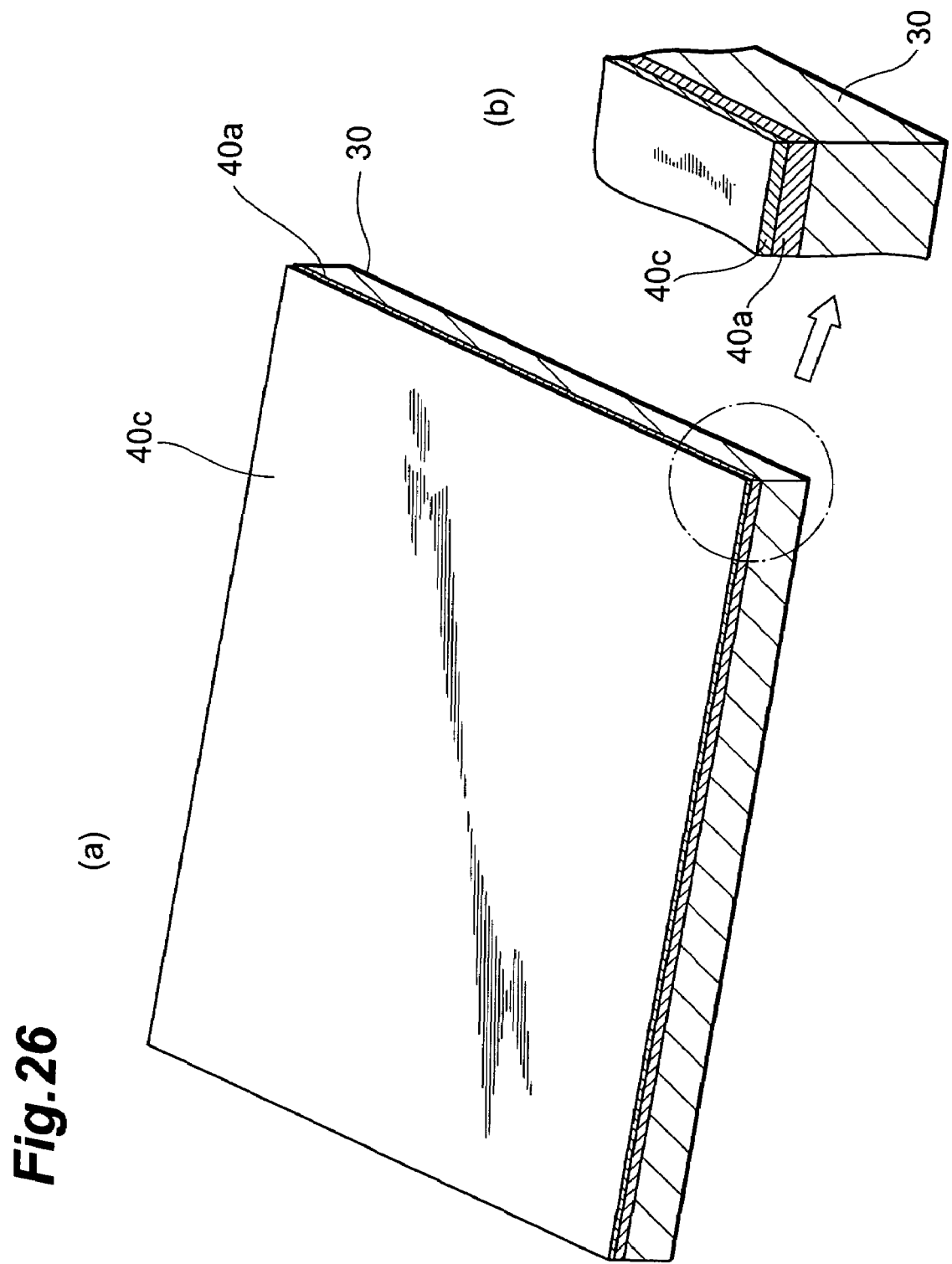
FIG. 26(a) and FIG. 26(b) are diagrams showing the other manufacturing method of the optical waveguide layer as the seventh modification.

First, the wafer 30 having the principal surface 30a is prepared as shown in FIG. 24. Subsequently, as shown in FIG. 25(a) and FIG. 25(b) showing an enlarged view of a part of FIG. 25(a), the lower clad layer 40a is formed on the principal surface 30a of the wafer 30. At this time, when the lower clad layer 40a is formed of a polymer such as a polyimide or the like, the lower clad layer 40a may be coated (preferably, spin-coated) on the main principal surface 30a.

Subsequently, as shown in FIG. 26(a) and FIG. 26(b) showing an enlarged view of a part of FIG. 26(a), the core layer 40c is formed on the lower clad layer 40a. At this time, the core layer 40c is formed of material having a higher refractive index than the lower clad layer 40a. Furthermore, when the core layer 40c is formed of a polymer such as a polyimide or the like, the core layer 40c may be coated (preferably, spin-coated) on the lower clad layer 40a as in the case of the lower clad layer 40a.

Figure 27:
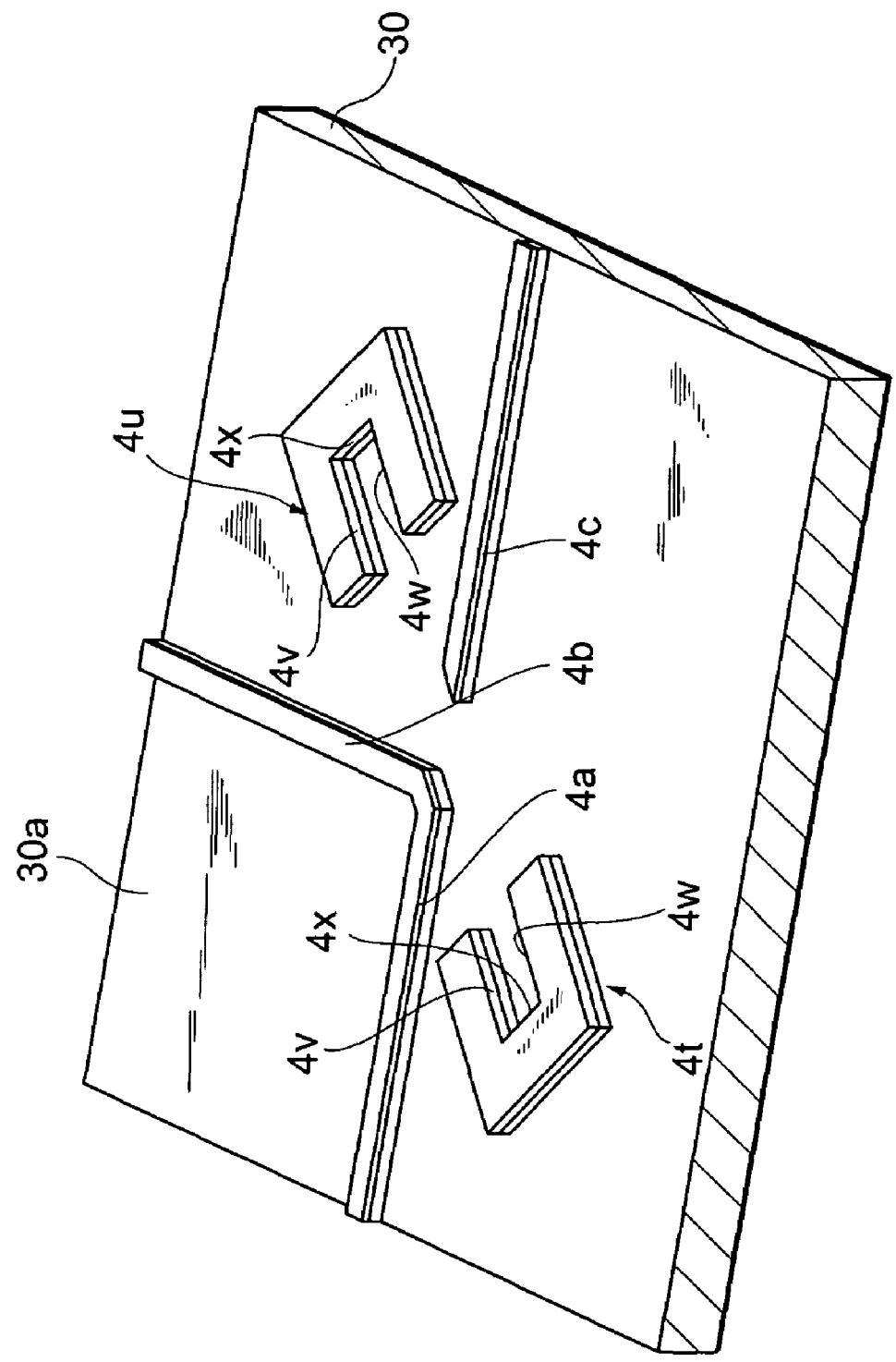
FIG. 27 is a diagram showing the other manufacturing method of the optical waveguide layer as the seventh modification.

Subsequently, the core layer 40c and the lower clad layer 40a are etched by using a mask to form the core portions 4a to 4c and positioning portions 4t and 4u as shown in FIG. 27. At this time, the core layer 40c and the lower clad layer 40a are etched (preferably dry-etched) by using a mask having a planar shape of the core portions 4a to 4c and the positioning portions 4t and 4u. Here, the positioning portions 4t and 4u are portions for defining the position of the reflecting face of the wavelength filter 4d mounted in the subsequent step. The positioning portions 4t and 4u are formed juxtaposed to each other along the longitudinal direction of an area in which the wavelength filter 4d should be mounted. Furthermore, the positioning portions 4t and 4u have the recess portion including side surfaces 4v and 4w facing each other and a side surface 4x, and the recess portions of the positioning portions 4t and 4u are disposed to face each other. The portions of the positioning portions 4t and 4u at which the core layer 40c is etched are positioned in the same layer as the core portions 4a to 4c, and also formed of the same material.

When the core portions 4a to 4c and the positioning portions 4t and 4u are formed, the core layer 40c and the lower clad layer 40a are preferably etched by dry etching. Furthermore, in order to secure the height of the positioning portions 4t and 4u, it is preferable that the etching depth when the core layer 40c and the lower clad layer 40a are etched is larger than the thickness of the core layer 40c. For example, the core layer 40c and the lower clad layer 40a may be etched until the principal surface 30a of the wafer 30 is exposed.

Figure 28:
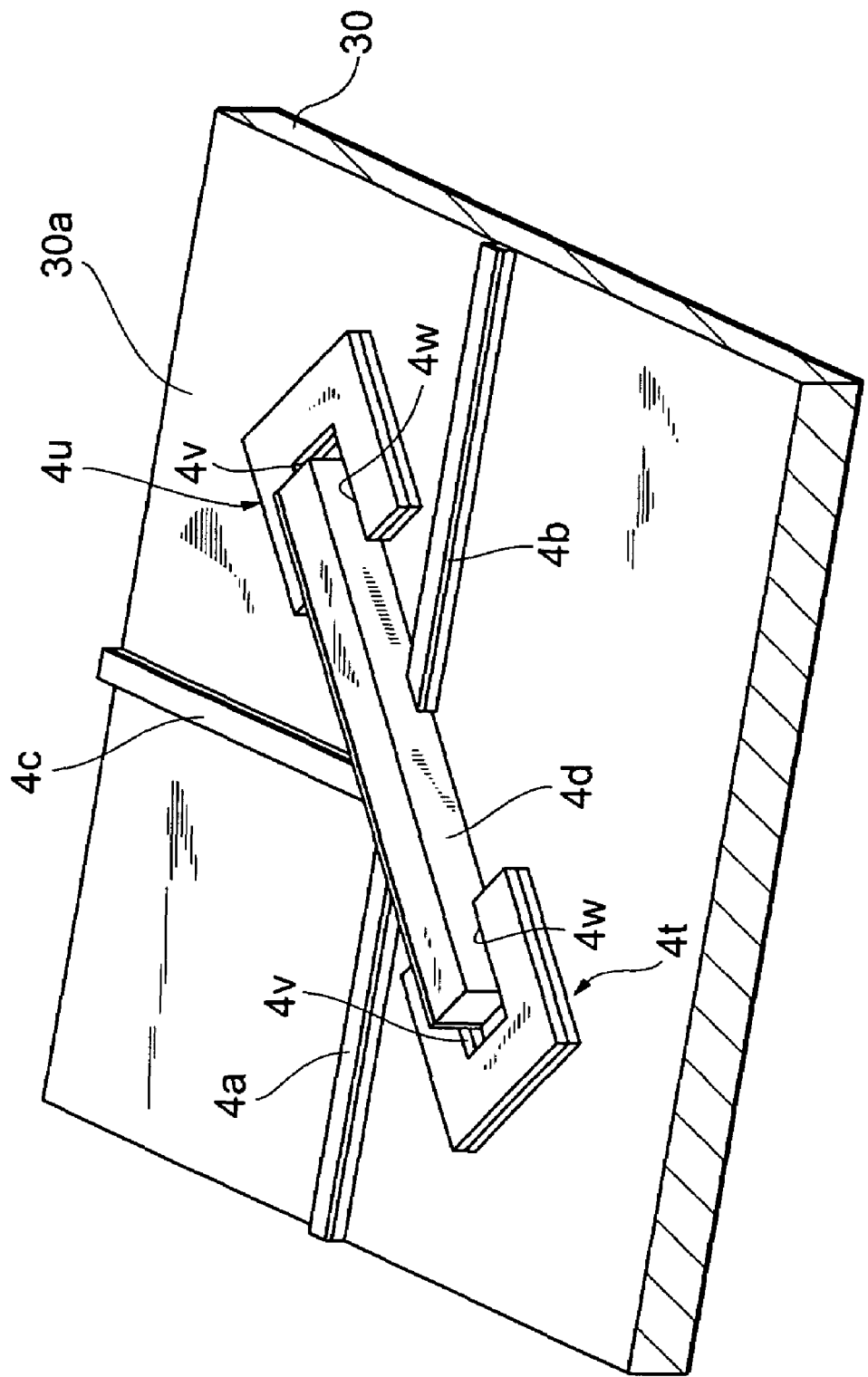
FIG. 28 is a diagram showing the other manufacturing method of the optical waveguide layer as the seventh modification.

Subsequently, as shown in FIG. 28, the wavelength filter 4d is mounted on the principal surface 30a of the wafer 30. At this time, the wavelength filter 4d is mounted so that the reflecting face of the wavelength filter 4d is pressed against the side surface 4v of the positioning portions 4t and 4u. As described above, the positioning portions 4t and 4u formed by using the same mask as the core portions 4a to 4c are used to position the reflecting face of the wavelength filter 4d, whereby the positional precision of the reflecting face of the wavelength filter 4d to the core portions 4a to 4c can be enhanced. When the clad player 40b formed in the next step contains a polymer such as a polyimide or the like, the wavelength filter 4d containing a polymer such as a polyimide or the like may be likewise mounted. Furthermore, more preferably, the wavelength filter 4d containing the same kind of material as the clad layer 40b may be mounted.

Figure 10:
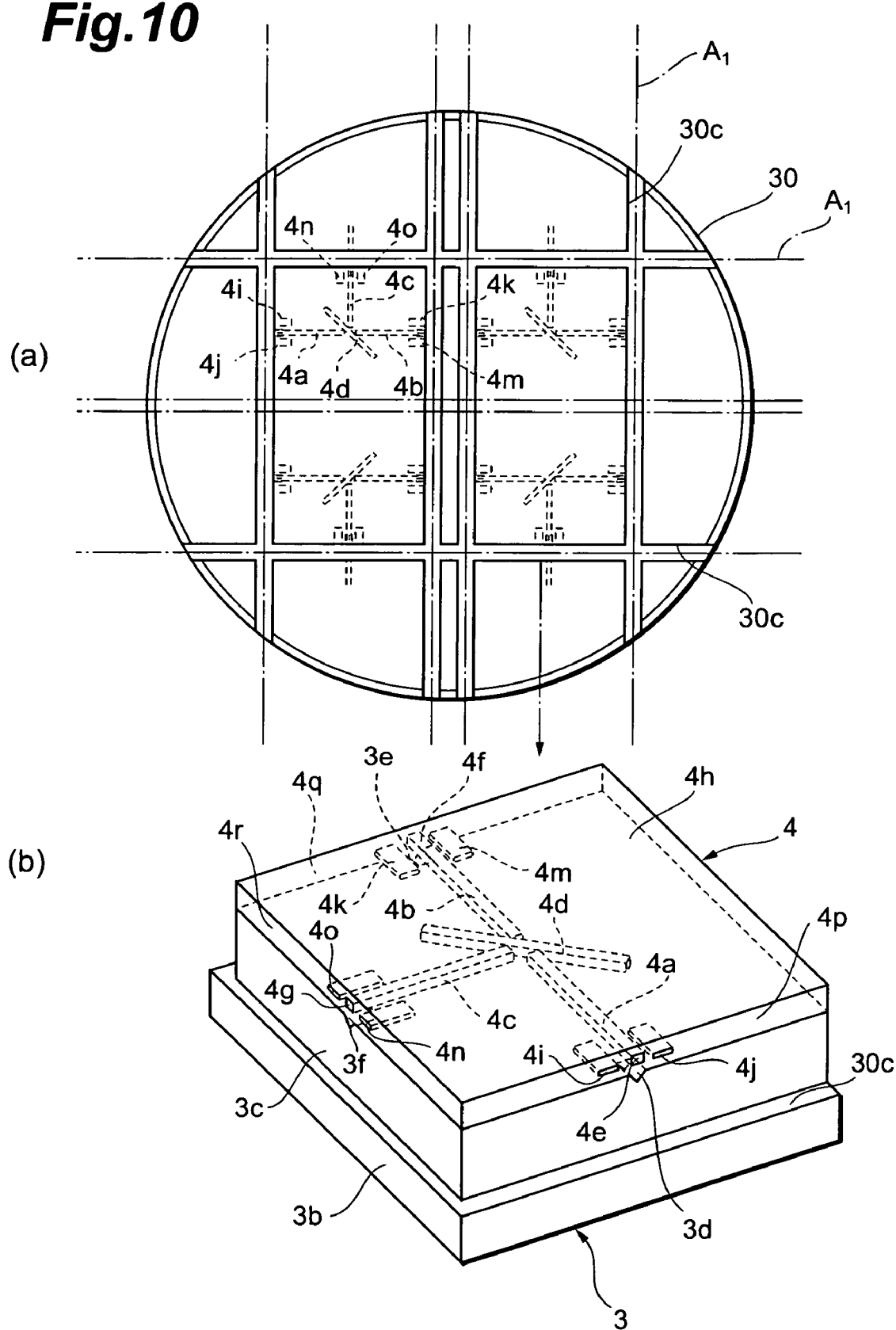
FIG. 10(a) and FIG. 10(b) are diagrams showing the manufacturing process of the optical waveguide substrate according to the first embodiment.
Figure 29:
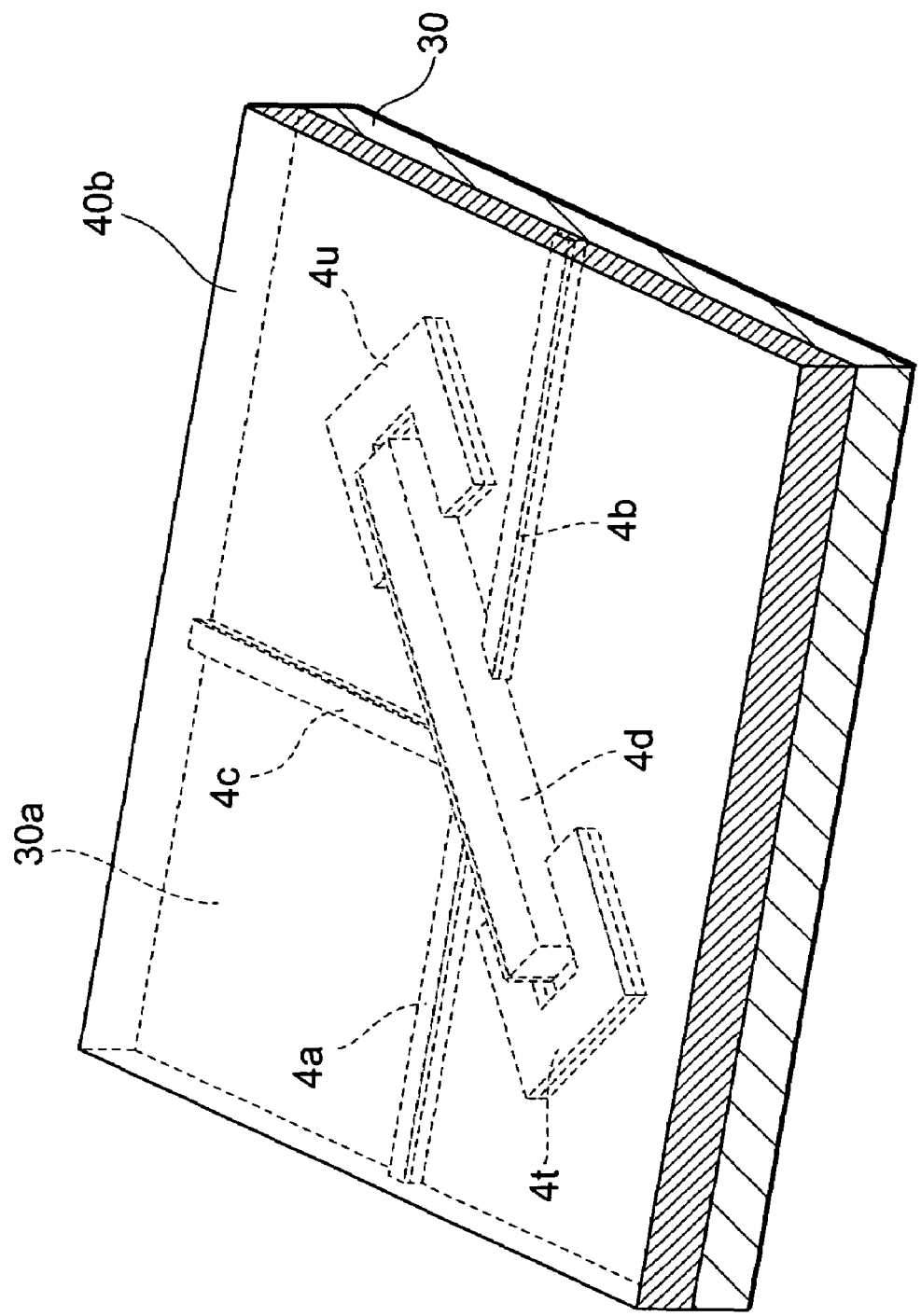
FIG. 29 is a diagram showing the other manufacturing method of the optical waveguide layer as the seventh modification.

Subsequently, as shown in FIG. 29, the clad layer 40b having a lower refractive index than the core portions 4a to 4c is formed. At this time, the clad layer 40b is formed so as to cover all the principal surface 30a, the core portions 4a to 4c, the positioning portions 4t and 4u and the wavelength filter 4d. Accordingly, the clad layer 40b containing the core portions 4a to 4c and the wavelength filter 4d therein is formed. When the clad layer 40b is formed of a polymer such as a polyimide or the like, the clad layer 40b may be formed by coating (preferably, spin-coating). Thereafter, by carrying out the same steps as shown in FIGS. 9 to 11 of the first embodiment, the optical waveguide substrate according to this modification is completed.

As described above, according to one or more embodiments and modifications of the optical device of the present invention, the optical coupling efficiency between the semiconductor optical element and the optical waveguide can be enhanced.

The optical device of the present invention is not limited to each embodiment and each modification, and various other modifications may be made. For example, in the respective embodiments and the respective modifications, the optical part such as the wavelength filter is contained in the optical waveguide layer, however, no optical part may be contained in the optical waveguide layer. Furthermore, various parts (for example, a half mirror) other than the wavelength filter may be used as the optical part.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical device comprising:
a semiconductor optical element; and
an optical waveguide substrate having a core portion extending in a direction crossing a layer thickness direction and an optical waveguide layer containing a clad portion covering the core portion, an end face of the core portion that is optically coupled to the semiconductor optical element being provided to the side surface of the optical waveguide substrate, wherein
the optical waveguide substrate further has first and second substrates disposed so that the principal surfaces thereof are facing each other,
the optical waveguide layer is provided between the first substrate and the second substrate,
the semiconductor optical element is disposed on a mount area of the side surface of the optical waveguide substrate,
the mount area contains the end face of the core portion, a part of the side surface of the first substrate and a part of the side surface of the second substrate, wherein the mount area is contained in the bottom surface of a recess portion formed on the side surface of the optical waveguide substrate.

2. The optical device according to claim 1, wherein the recess portion of the optical waveguide substrate contains a step portion formed along the edge of the principal surface in each of the first and second substrates.

3. An optical device comprising:
a semiconductor optical element; and
an optical waveguide substrate having a core portion extending in a direction crossing a layer thickness direction and an optical waveguide layer containing a clad portion covering the core portion, an end face of the core portion that is optically coupled to the semiconductor optical element being provided to the side surface of the optical waveguide substrate, wherein the optical waveguide substrate further has first and second substrates disposed so that the principal surfaces thereof are facing each other, the optical waveguide layer is provided between the first substrate and the second substrate, the semiconductor optical element is disposed on a mount area of the side surface of the optical waveguide substrate, the mount area contains the end face of the core portion, a part of the side surface of the first substrate and a part of the side surface of the second substrate, wherein the optical waveguide substrate has, on the side surface, a first mark indicating the position of the end face in a direction along the edge of the principal surface of each of the first and second substrates, and wherein the first mark comprises a groove formed on the principal surface of the first substrate so as to reach the side surface of the optical waveguide substrate.

4. An optical device comprising:
a semiconductor optical element; and
an optical waveguide substrate having a core portion extending in a direction crossing a layer thickness direction and an optical waveguide layer containing a clad portion covering the core portion, an end face of the core portion that is optically coupled to the semiconductor optical element being provided to the side surface of the optical waveguide substrate, wherein the optical waveguide substrate further has first and second substrates disposed so that the principal surfaces thereof are facing each other, the optical waveguide layer is provided between the first substrate and the second substrate, the semiconductor optical element is disposed on a mount area of the side surface of the optical waveguide substrate, and the mount area contains the end face of the core portion, a part of the side surface of the first substrate and a part of the side surface of the second substrate, wherein the optical waveguide layer has, on the side surface, a second mark indicating the position of the end face in the layer thickness direction, and wherein the second mark comprises a film that contains a material different from that of the clad portion and embedded in the clad portion so as to be exposed from the side surface of the clad portion.

5. An optical device comprising:
a semiconductor optical element; and
an optical waveguide substrate having a core portion extending in a direction crossing a layer thickness direction and an optical waveguide layer containing a clad portion covering the core portion, an end face of the core portion that is optically coupled to the semiconductor optical element being provided to the side surface of the optical waveguide substrate, wherein the optical waveguide substrate further has first and second substrates disposed so that the principal surfaces thereof are facing each other, the optical waveguide layer is provided between the first substrate and the second substrate, the semiconductor optical element is disposed on a mount area of the side surface of the optical waveguide substrate, and the mount area contains the end face of the core portion, a part of the side surface of the first substrate and a part of the side surface of the second substrate, and wherein the optical waveguide substrate has a step between the side surfaces of the first and second substrates in the mount area.

6. The optical device according to claim 1, wherein the optical waveguide substrate further has a wiring pattern electrically connected to the semiconductor optical element on the side surface of each of the first and second substrates in the mount area.

7. The optical device according to claim 1, further comprising
a wiring substrate having a wiring pattern electrically connected to the semiconductor optical element between the side surface of the optical waveguide substrate and the semiconductor optical element, wherein
the wiring substrate has a light passing portion at the position corresponding to the end face of the core portion.

8. The optical device according to claim 1, wherein the optical waveguide substrate further has a metal layer for joining the second substrate and the optical waveguide layer to each other between the second substrate and the optical waveguide layer.

9. An optical device comprising:
semiconductor optical elements of n (n represents an integer of 2 or more); and
an optical waveguide substrate having optical waveguide layers of n layers that contain core portions extending in a direction crossing a layer thickness direction and a clad portion covering the core portions, and laminated in the layer thickness direction, and having on a side surface thereof an end face of the core portion of each optical waveguide layer optically coupled to each of the semiconductor optical elements of n, wherein
the optical waveguide substrate further has substrates of (n≒1) that are laminated in the layer thickness direction so as to be alternated with the optical waveguide layers of n layers,
the semiconductor optical elements of n are respectively mounted on mount areas of n on the side surface of the optical waveguide substrate, and
each of the mount area of n contains the end face of the core portion of the corresponding optical waveguide layer of the optical waveguide layers of n layers and a part of the side surface of each of the substrates disposed at both sides of the optical waveguide layer.

10. The optical device according to claim 3, wherein the optical waveguide substrate further has a wiring pattern electrically connected to the semiconductor optical element on the side surface of each of the first and second substrates in the mount area.

11. The optical device according to claim 3, further comprising
a wiring substrate having a wiring pattern electrically connected to the semiconductor optical element between the side surface of the optical waveguide substrate and the semiconductor optical element, wherein
the wiring substrate has a light passing portion at the position corresponding to the end face of the core portion.

12. The optical device according to claim 3, wherein the optical waveguide substrate further has a metal layer for joining the second substrate and the optical waveguide layer to each other between the second substrate and the optical waveguide layer.

13. The optical device according to claim 4, wherein the optical waveguide substrate further has a wiring pattern electrically connected to the semiconductor optical element on the side surface of each of the first and second substrates in the mount area.

14. The optical device according to claim 4, further comprising
a wiring substrate having a wiring pattern electrically connected to the semiconductor optical element between the side surface of the optical waveguide substrate and the semiconductor optical element, wherein
the wiring substrate has a light passing portion at the position corresponding to the end face of the core portion.

15. The optical device according to claim 4, wherein the optical waveguide substrate further has a metal layer for joining the second substrate and the optical waveguide layer to each other between the second substrate and the optical waveguide layer.

16. The optical device according to claim 5, wherein the optical waveguide substrate further has a wiring pattern electrically connected to the semiconductor optical element on the side surface of each of the first and second substrates in the mount area.

17. The optical device according to claim 5, further comprising
a wiring substrate having a wiring pattern electrically connected to the semiconductor optical element between the side surface of the optical waveguide substrate and the semiconductor optical element, wherein
the wiring substrate has a light passing portion at the position corresponding to the end face of the core portion.

18. The optical device according to claim 5, wherein the optical waveguide substrate further has a metal layer for joining the second substrate and the optical waveguide layer to each other between the second substrate and the optical waveguide layer.

* * * * *